US012509900B2

(12) United States Patent
Wang et al.

(10) Patent No.: US 12,509,900 B2
(45) Date of Patent: Dec. 30, 2025

(54) CLEANING DEVICE

(71) Applicant: XINGMAI INNOVATION TECHNOLOGY (SUZHOU) CO., LTD., Suzhou (CN)

(72) Inventors: Shengle Wang, Suzhou (CN); Shilei Zhang, Suzhou (CN)

(73) Assignee: XINGMAI INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 19/304,453

(22) Filed: Aug. 19, 2025

(65) Prior Publication Data

US 2025/0369246 A1    Dec. 4, 2025

Related U.S. Application Data

(63) Continuation of application No. PCT/CN2024/076025, filed on Feb. 5, 2024.

(30) Foreign Application Priority Data

Feb. 23, 2023  (CN) .......................... 202320298525.2
Sep. 8, 2023   (CN) .......................... 202311159683.0
Nov. 17, 2023  (CN) .......................... 202311540590.2

(51) Int. Cl.
*E04H 4/16*     (2006.01)
*B01D 29/11*    (2006.01)
(Continued)

(52) U.S. Cl.
CPC ........... *E04H 4/1654* (2013.01); *B01D 29/11* (2013.01); *C02F 1/001* (2013.01); *G01D 5/145* (2013.01);
(Continued)

(58) Field of Classification Search
None
See application file for complete search history.

(56) References Cited

U.S. PATENT DOCUMENTS 6,842,931 B2    1/2005 Porat
9,133,639 B2    9/2015 Ben Dov
(Continued)

FOREIGN PATENT DOCUMENTS

CN     215457656 U    1/2022
CN     114305231 A    4/2022
(Continued)

OTHER PUBLICATIONS

International Search Report—WO2024174864.
(Continued)

*Primary Examiner* — Krishnan S Menon
(74) *Attorney, Agent, or Firm* — Soleado Law, PC

(57) ABSTRACT

The present disclosure provides a pool cleaning robot. The pool cleaning robot includes a body; a filtering box detachably mounted on the body; and an in-position detection mechanism for the filtering box, where the in-position detection mechanism for the filtering box is configured to detect whether the filtering box is mounted in position on the body. The in-position detection mechanism for the filtering box includes a sensing assembly, and the sensing assembly includes a sensing part and a sensing mating part. The sensing part and the sensing mating part are both disposed at a position other than the filtering box, and the filtering box moves, so that the sensing part mates with the sensing mating part to detect whether the filtering box is mounted in position on the body.

20 Claims, 12 Drawing Sheets

(51) Int. Cl.
  *C02F 1/00* (2023.01)
  *C02F 103/42* (2006.01)
  *G01D 5/14* (2006.01)
(52) U.S. Cl.
  CPC ...... *B01D 2201/40* (2013.01); *C02F 2103/42* (2013.01); *C02F 2201/008* (2013.01)

(56) References Cited

U.S. PATENT DOCUMENTS

| | | |
|---|---|---|
| 9,163,421 B2 | 10/2015 | Van Der Meijden |
| 9,683,383 B2 | 6/2017 | Shlomi-Shlomi et al. |
| 10,378,229 B2 | 8/2019 | Ben Dov |
| 2021/0330148 A1 | 10/2021 | Sun |
| 2022/0112735 A1 | 4/2022 | Besnier |

FOREIGN PATENT DOCUMENTS

| | | |
|---|---|---|
| CN | 216417046 U | 5/2022 |
| CN | 114617488 A | 6/2022 |
| CN | 216854601 U | 7/2022 |
| CN | 114837476 A | 8/2022 |
| CN | 217524932 U | 10/2022 |
| CN | 217744228 U | 11/2022 |
| CN | 218186696 U | 1/2023 |
| CN | 218304772 U | 1/2023 |
| CN | 218306593 U | 1/2023 |
| CN | 116696132 A | 9/2023 |
| CN | 116999943 A | 11/2023 |
| EP | 2706170 B1 | 11/2020 |

OTHER PUBLICATIONS

Written Opinion of the International Searching Authority—WO2024174864.
First Office Action and Search Report (CN2023115405902).

CLEANING DEVICE

CROSS REFERENCE TO RELATED APPLICATIONS

The present application is a continuation of prior International Patent Application No. PCT/CN2024/076025, filed on Feb. 5, 2024, which claims priority to: Chinese Patent Application No. 202311159683.0, filed with the China National Intellectual Property Administration on Sep. 8, 2023 and entitled "FILTERING ASSEMBLY AND UNDERWATER CLEANING DEVICE", Chinese Patent Application No. 202311540590.2, filed with the China National Intellectual Property Administration on Nov. 17, 2023 and entitled "FILTERING ASSEMBLY AND UNDERWATER CLEANING DEVICE", and Chinese Patent Application No. 202320298525.2, filed with the China National Intellectual Property Administration on Feb. 23, 2023 and entitled "POOL CLEANING ROBOT", which are hereby incorporated by reference herein.

TECHNICAL FIELD

The present disclosure relates to the technical field of operating devices for liquid, and in particular to, a cleaning device.

BACKGROUND

An underwater cleaning device includes a filtering assembly configured to perform filtering and accumulate underwater debris. In a related technology, the filtering assembly includes a cavity and a filtering portion communicating with the cavity. To improve a filtering effect, the filtering portion is disposed on each of four sides surrounding the cavity. Generally, the filtering portion includes an exchange opening communicating with the cavity and a filtering layer covering the exchange opening. When water flows out of the cavity, the filtering layer is configured to filter out debris in the water.

However, when there is a large amount of debris, the debris accumulates at the filtering layer, blocking filtering holes of the filtering layer. When the filtering layer is blocked, the water in the filtering assembly may not easily flow to a pump suction assembly through the filtering layer, resulting in an insufficient amount of water flowing into the pump suction assembly. Consequently, a thrust generated by the pump suction assembly is insufficient, affecting wall climbing or slope climbing performance of the underwater cleaning device and reducing user experience.

SUMMARY OF THE DISCLOSURE

The present disclosure provides a cleaning device, including a cleaning device body. The cleaning device body includes: at least one filtering box cavity; a filtering mechanism, including at least one filtering assembly, where the filtering assembly is disposed in the filtering box cavity, and the filtering assembly includes at least one filtering box provided with a first cavity and a filtering box water inlet portion communicating with the first cavity; at least one flow guiding opening and a cover part mating with the flow guiding opening, where the flow guiding opening is provided on the filtering box; and a drive mechanism including at least one main water pump, where the main water pump is disposed outside the filtering box cavity, and the main water pump communicates with the first cavity of the filtering box. The filtering assembly has a first state and a second state. In the first state, the cover part covers the flow guiding opening, and the main water pump is configured to generate a first water flow that passes sequentially through the filtering box water inlet portion, the first cavity, the filtering box cavity, and the main water pump. In the second state, the cover part is opened to expose the flow guiding opening, the main water pump is configured to generate a second water flow, and at least a part of the second water flow passes sequentially through the filtering box water inlet portion, the first cavity, the flow guiding opening, the filtering box cavity, and the main water pump.

In some embodiments, the cover part is pivotally connected to the filtering box. The cleaning device further includes an adjustment part mounted to the cover part. The adjustment part is away from a pivoting joint between the cover part and the filtering box. The adjustment part assists the cover part in covering the flow guiding opening or being opened to expose the flow guiding opening.

In some embodiments, the cover part includes a first end and a second end opposite to each other. The first end is located at an uppermost end of the cover part, and the second end is located at a lowermost end of the cover part. The first end is pivotally connected to the filtering box, and the second end is pivoted around the first end until the flow guiding opening is exposed or covered. When the cleaning device is entirely located underwater, gravity of the adjustment part is greater than a buoyancy force. Alternatively, the second end is pivotally connected to the filtering box, and the first end is pivoted around the second end until the flow guiding opening is exposed or covered. When the cleaning device is entirely located underwater, a buoyancy force applied to the adjustment part is greater than gravity.

In some embodiments, the first end is pivotally connected to the filtering box, and a ratio of a distance between a center of the adjustment part and the first end to a distance between the center of the adjustment part and the second end is less than 1.

In some embodiments, the first end is pivotally connected to the filtering box. The adjustment part protrudes from an inner side surface of the cover part, and the inner side surface faces the first cavity. When the filtering box is in a first state, an included angle between a gravity direction and a connection line between a gravity center of the adjustment part and a pivot center of the cover part is an acute angle.

In some embodiments, the second end is pivotally connected to the filtering box, and the cleaning device further includes a moving part. The cover part further includes an accommodating channel. The accommodating channel is provided between the first end and the second end. A center line of the accommodating channel intersects with a plane on which the first end or the second end is located. The moving part is accommodated in the accommodating channel and can move along the accommodating channel.

In some embodiments, the center line of the accommodating channel vertically intersects with the plane on which the first end or the second end is located.

In some embodiments, the cover part includes an inner side surface facing the first cavity. The accommodating channel extends from the second end to the first end along a direction close to the inner side surface.

In some embodiments, a mounting bracket is disposed on a side wall of the filtering box. The mounting bracket covers the flow guiding opening. A part of the mounting bracket is provided with a plurality of grill holes, and the part of the mounting bracket covers the flow guiding opening. The grill holes communicate with the flow guiding opening. The cover part is movably mounted to the mounting bracket.

In some embodiments, a side surface of the mounting bracket faces the first cavity, and the side surface is recessed to form an accommodating cavity. A side wall of the accommodating cavity is provided with a pivoting portion mounting groove. The cover part is movably accommodated in the accommodating cavity. The cover part is provided with a pivoting portion protruding from the cover part. A stop position-limiting protrusion is provided below the pivoting portion. The pivoting portion is pivotally mounted in the pivoting portion mounting groove. The stop position-limiting protrusion moves with the cover part to stop on the side wall.

In some embodiments, a lap portion extends from an edge of the cover part. The lap portion abuts against an inner side surface of the mounting bracket when the cover part is accommodated in the accommodating cavity.

In some embodiments, the cleaning device includes a drive assembly. The drive assembly is connected to the cover part and is configured to drive the cover part to cover the flow guiding opening or be opened to expose the flow guiding opening.

In some embodiments, the cover part is movably connected to the cleaning device.

In some embodiments, the main water pump includes a main water pump impeller casing. An area of the flow guiding opening of the cleaning device is larger than a cross-sectional area, for water entering, of the main water pump impeller casing.

In some embodiments, the cover part is pivotally connected to the filtering box cavity.

In some embodiments, the cleaning device further includes a flipping cover. The filtering box cavity is provided with an opening. The flipping cover covers the opening. The cover part is movably connected to the flipping cover to cover the flow guiding opening or be opened to expose the flow guiding opening of the filtering box cavity.

In some embodiments, the cover part is provided with a second filtering layer, and the second filtering layer communicates with the first cavity and a second cavity when the cleaning device is in the first state.

In some embodiments, a sensing part is disposed on the cleaning device body, and a sensing mating part is disposed on the filtering box. The filtering box is provided with a mounting groove, and the sensing mating part is sealed in the mounting groove.

In some embodiments, the sensing part is disposed on the cleaning device body, and the sensing mating part is disposed on the filtering box. The sensing mating part and the filtering box are an integral structure, so that the sensing mating part is located in a side wall of the filtering box.

In some embodiments, a sensing assembly is waterproof.

In some embodiments, an in-position detection mechanism for the filtering box further includes a first sealed box. The sensing part is disposed in the first sealed box, and the first sealed box is disposed at a side of the filtering box.

In some embodiments, the cleaning device further includes a positioning assembly disposed between the cleaning device body and the filtering box. The positioning assembly is configured to constrain a position of the filtering box in the cleaning device body.

BRIEF DESCRIPTION OF THE DRAWINGS

To more clearly describe the technical solutions in embodiments of the present disclosure, the following briefly introduces the accompanying drawings required for describing embodiments. It is clear that the accompanying drawings in the following description show merely some embodiments of the present disclosure, and a person of ordinary skill in the art may still derive other drawings from these accompanying drawings without creative efforts.

Figure 1:
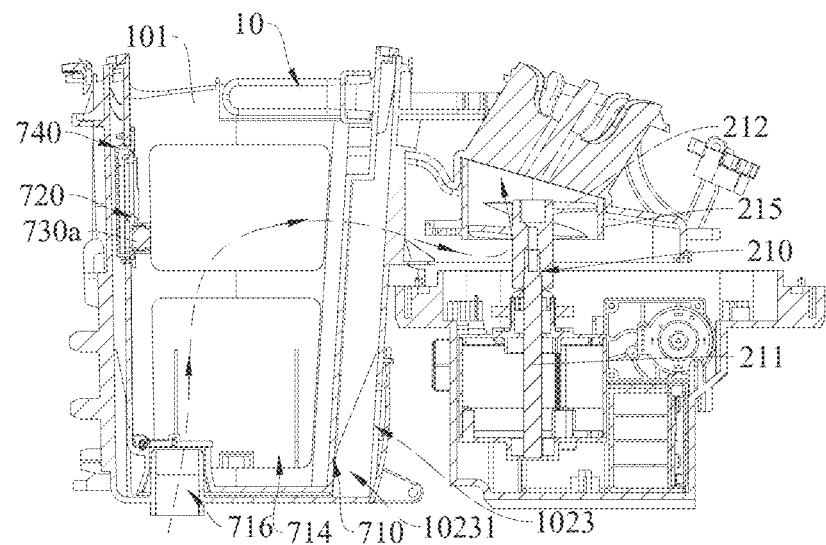
FIG. 1 is a partial schematic cross-sectional view of a cleaning device according to a first embodiment of the present disclosure.

Reference numerals in the drawings: 10: cleaning device; 101: cleaning device body; 1021: first sealed cavity; 1023: filtering box cavity; 10231: second cavity; 10232: filtering box cavity opening; 10233: filtering box cavity duct; 103: liquid inlet portion; 1031: first water inlet; 1032: second water inlet; 210: main water pump; 211: main water pump motor; 212: main water pump impeller; 215: main water pump impeller casing; 710: filtering assembly; 711: filtering box; 7111a: first side surface; 7111b: second side surface; 7111c: third side surface; 7111d: fourth side surface; 7111e: fifth side surface; 712: first sub-filtering box; 7121: first sub-filtering layer; 7122: first filtering mesh hole; 7123: first water inlet; 713: second sub-filtering box; 7131: second sub-filtering layer; 7132: second filtering mesh hole; 7133: second inlet; 714: first cavity; 715: flow guiding opening; 716: filtering box water inlet portion; 720: cover part; 720a: first end; 720b: second end; 721: adjustment part mounting portion; 722: accommodating channel; 723: pivoting portion; 724: lap portion; 725: inner side surface; 730a, 730b: adjustment part; 731: moving part; 740: mounting bracket; 741: grill hole; 742: accommodating cavity; 743: pivoting portion mounting groove; 744: mounting portion; 745: mounting buckle; 770: first filtering assembly; 780: second filtering assembly; 790: valve part; 970: light assembly; 971: light control board; 980: sensing assembly; 981: sensing part; 982: sensing mating part; 990: sensing drive assembly; 991: sensing bracket; 9911: first sensing bracket; 99111: first bracket portion; 9912: second sensing bracket; 99121: second bracket portion; 992: sensing elastic part.

DETAILED DESCRIPTION

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by a person of ordinary skill in the art based on embodiments of the present disclosure without creative efforts shall fall within the protection scope of the present disclosure.

Figure 2:
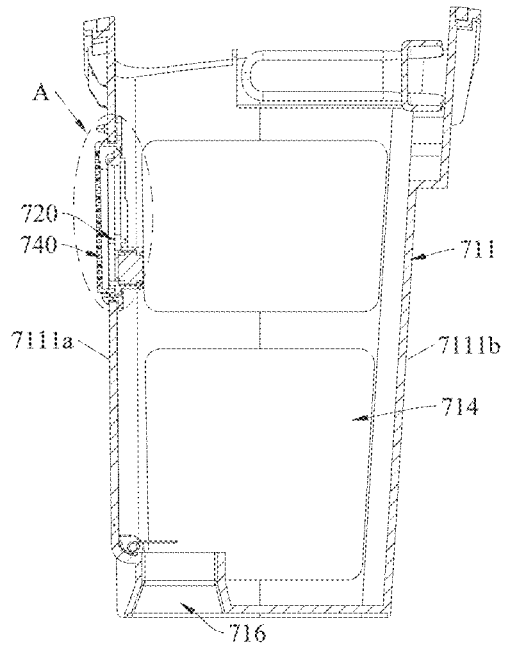
FIG. 2 is a schematic cross-sectional view of a filtering assembly of a cleaning device in a first state according to a first embodiment of the present disclosure.
Figure 3:
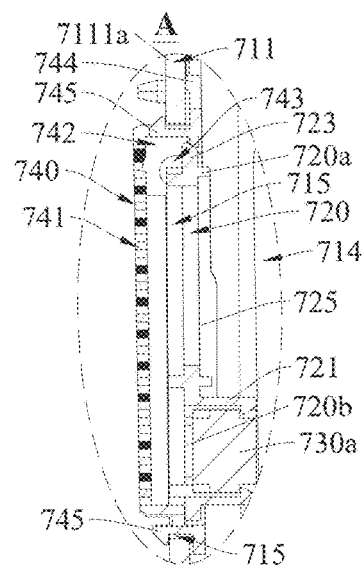
FIG. 3 is an enlarged view of a portion A shown in FIG. 2.

FIG. 1 is a partial schematic cross-sectional view of a cleaning device according to a first embodiment of the present disclosure. FIG. 2 is a schematic cross-sectional view of a filtering assembly of the cleaning device in a first state according to the first embodiment of the present disclosure. FIG. 3 is an enlarged view of a portion A shown in FIG. 2.

The present disclosure provides a cleaning device 10. The cleaning device 10 is configured to clean stains and suspended matters in a pool, a swimming pool, and the like. The cleaning device 10 may be a pool cleaning robot, a swimming pool cleaning robot, an underwater cleaning device, or the like. This is not limited herein. The cleaning device 10 includes a cleaning device body 101. The cleaning device body 101 includes at least one filtering box cavity 1023, a filtering mechanism, and a drive mechanism. The filtering mechanism includes at least one filtering assembly 710. The filtering assembly 710 is disposed in the filtering box cavity 1023. The filtering assembly 710 includes at least one filtering box 711, a first filtering layer (not shown in the figure), at least one flow guiding opening 715, and a cover part 720. The filtering box 711 is provided with a first cavity 714. The filtering box cavity 1023 communicates with the first cavity 714 of the filtering box 711. The filtering box 711 has at least a first state and a second state. The first filtering layer is disposed at least on a side wall of the filtering box 711. The first filtering layer communicates with the first cavity 714. The flow guiding opening 715 is provided on the filtering box 711 and/or the first filtering layer. For example, the flow guiding opening 715 may be provided on the filtering box 711, or the flow guiding opening 715 may be provided on the first filtering layer, or the flow guiding opening 715 may be provided on both the filtering box 711 and the first filtering layer. When the filtering box 711 is in the first state, the cover part 720 seals and covers the flow guiding opening 715. When the filtering box 711 is in the second state, the cover part 720 is opened to expose the flow guiding opening 715. It may be understood that exposing the flow guiding opening 715 indicates that at least a part of water can flow out of the filtering box 711 through the flow guiding opening 715.

A filtering box water inlet portion 716 on the filtering box 711 is configured to allow water to enter the first cavity 714. The first filtering layer is configured to perform filtering. The water enters the first cavity 714 of the filtering box 711 through the filtering box water inlet portion 716, and the first filtering layer filters out debris in the water. The filtered water enters the filtering box cavity 1023 of the filtering assembly 710 and flows to a main water pump 210 through the filtering box cavity 1023.

The first state may be a state of the filtering assembly 710 when the cleaning device 10 cleans the bottom of a pool or a water surface. In the first state, the filtering assembly 710 is in a natural placement state, and the cover part 720 covers the flow guiding opening 715 in the natural placement state. A thrust generated by the water normally flowing through the filtering assembly 710 is not sufficient to push the cover part 720 to be opened to expose the flow guiding opening 715. The second state is a state of the filtering assembly 710 when the cleaning device 10 climbs a slope or a wall under the water surface or when the first filtering layer is clogged. In the second state, the filtering assembly 710 tilts, is inverted, or is in an operating state with the cleaning device 10, and the cover part 720 moves under the action of gravity and/or an external force, such as the thrust generated by the water flow, so that the flow guiding opening 715 is opened. The first state is different from the second state.

Figure 4:
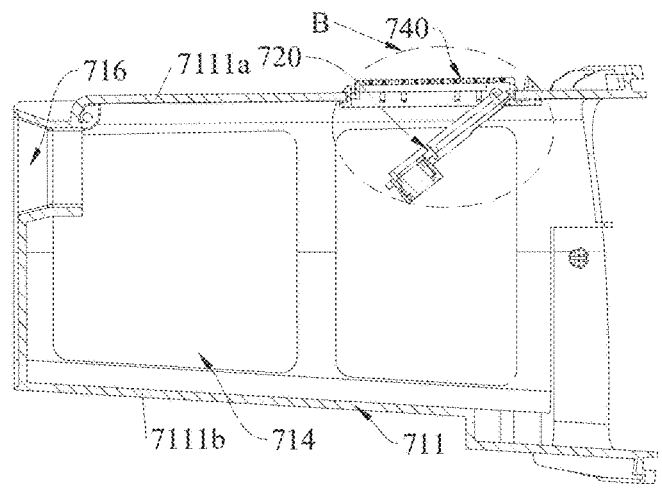
FIG. 4 is a schematic cross-sectional view of a filtering assembly of a cleaning device in a second state according to a first embodiment of the present disclosure.
Figure 5:
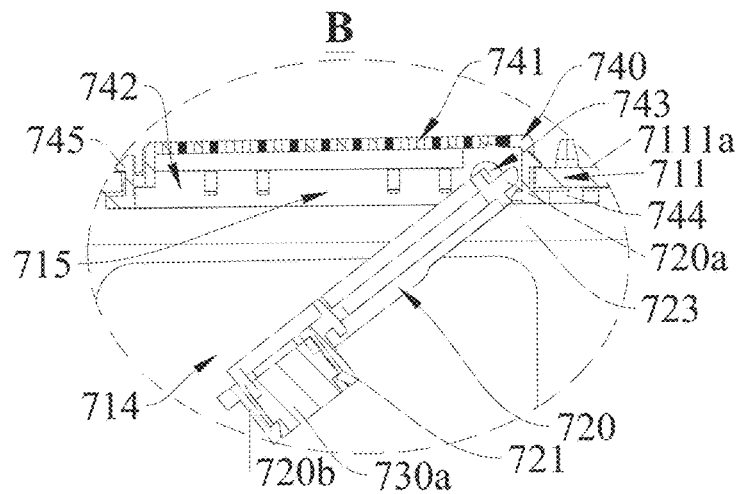
FIG. 5 is an enlarged view of a portion B shown in FIG. 4.

FIG. 4 is a schematic cross-sectional view of the filtering assembly of the cleaning device in the second state according to the first embodiment of the present disclosure. FIG. 5 is an enlarged view of a portion B shown in FIG. 4. With reference to FIG. 1 to FIG. 3, when the filtering box 711 is in the first state, the cover part 720 covers the flow guiding opening 715, and the water in the first cavity 714 flows out through the first filtering layer of the filtering box 711 to reduce an impact on a cleaning effect of the cleaning device 10, so that the cleaning device 10 implements the normal cleaning function.

Figure 6:
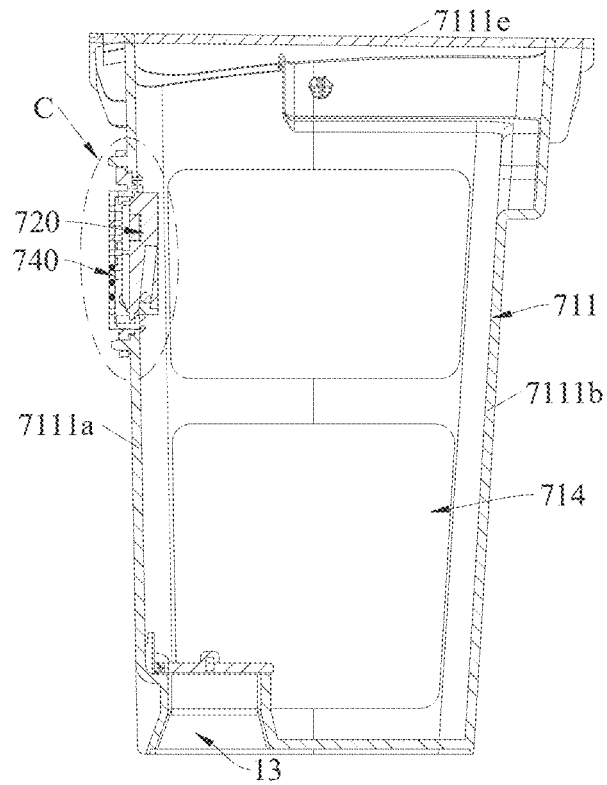
FIG. 6 is a schematic cross-sectional view of a filtering assembly of a cleaning device in a first state according to a second embodiment of the present disclosure.
Figure 7:
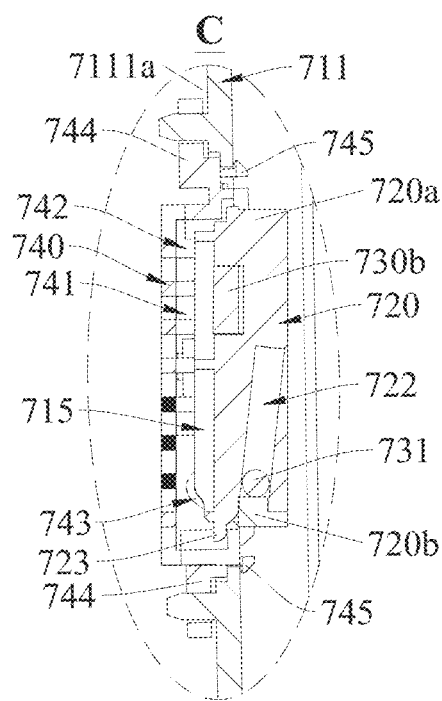
FIG. 7 is an enlarged view of a portion C shown in FIG. 6.
Figure 8:
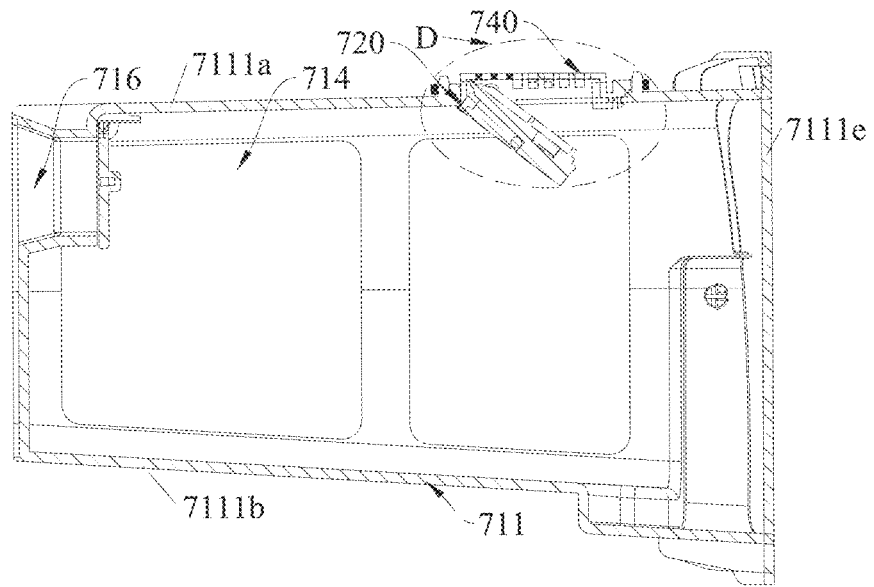
FIG. 8 is a schematic cross-sectional view of a filtering assembly of a cleaning device in a second state according to a second embodiment of the present disclosure.
Figure 9:
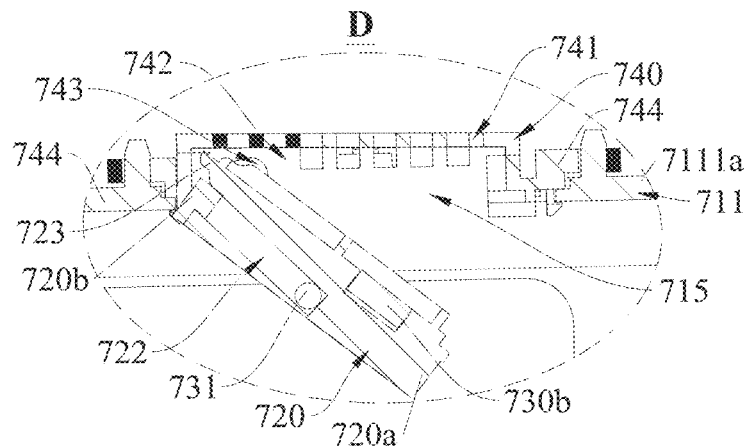
FIG. 9 is an enlarged view of a portion D shown in FIG. 8.

FIG. 6 is a schematic cross-sectional view of the filtering assembly of the cleaning device in the first state according to a second embodiment of the present disclosure. FIG. 7 is an enlarged view of a portion C shown in FIG. 6. FIG. 8 is a schematic cross-sectional view of the filtering assembly of the cleaning device in the second state according to the second embodiment of the present disclosure. FIG. 9 is an enlarged view of a portion D shown in FIG. 8. With reference to FIG. 1 to FIG. 5, when the filtering assembly 710 is in the second state, the cover part 720 is gradually opened to expose the flow guiding opening 715. At least a part of the water in the first cavity 714 flows out directly through the flow guiding opening 715. This increases an amount of water flowing out of the filtering box 711. In this way, when the cleaning device 10 climbs the wall or the slope or when the first filtering layer is clogged to a certain extent, a requirement for the amount of water flowing into the main water pump 210 can always be met, so that the cleaning device 10 can stably climb the wall or the slope or operate stably. Therefore, the cleaning device 10 can be applied to more situations, such as underwater cleaning and water surface cleaning.

For example, when the filtering assembly 710 operates in the first state, and the first filtering layer is not clogged by stains to a certain extent, the filtering assembly 710 is in a normal operating state. When the cleaning device 10 climbs the wall or the slope, the cover part 720 is opened under the action of gravity of the cover part or an external force to expose the flow guiding opening 715, so that the cleaning device 10 can stably climb the wall or the slope.

When the filtering assembly 710 operates in the first state, and the first filtering layer is clogged by stains to a certain extent, the filtering assembly 710 cannot operate normally. In this case, the cover part 720 is opened to expose the flow guiding opening 715 to increase the amount of water flowing into the main water pump 210 and maintain stable operation performance of the cleaning device 10, so that the cleaning device 10 can stably climb the slope or the wall.

When the filtering assembly 710 is climbing the slope or the wall, and the first filtering layer is clogged by stains, the cover part 720 is opened under the action of gravity of the cover part or the external force to expose the flow guiding opening 715, so that the cleaning device 10 can stably climb the wall or the slope.

Therefore, the first cavity 714, the flow guiding opening 715, and the cover part 720 of the filtering box 711 cooperate with each other, so that when the filtering box 711 is in the first state, the cover part 720 covers the flow guiding opening 715 to reduce an impact on the cleaning effect of the cleaning device 10. When the filtering box 711 is in the second state, the cover part 720 is opened to expose the flow guiding opening 715 to increase the amount of water flowing out of the first cavity 714 and increase the amount of water flowing into the main water pump 210. In this way, a thrust applied to the cleaning device 10 is improved, so that wall climbing, slope climbing, or operating performance of the cleaning device 10 is improved. This improves user experience.

The drive mechanism includes at least one main water pump 210. The main water pump 210 is disposed outside the filtering box cavity 1023. In a process of placing the cleaning device 10 in the pool, the main water pump 210 is configured to guide water in the pool to enter the first cavity 714 through the filtering box water inlet portion 716. Then, the water is filtered by the first filtering layer, flows into a second cavity 10231, and flows to the main water pump 210 through the second cavity 10231.

When the filtering assembly 710 is in the first state, the cover part 720 covers the flow guiding opening 715. The main water pump 210 is configured to guide water to flow to the main water pump 210 through the filtering box water inlet portion 716, the first cavity 714, the first filtering layer, and the second cavity 10231 sequentially. In other words, the main water pump 210 is configured to guide the water in the pool to flow into the first cavity 714 through the filtering box water inlet portion 716. The water in the first cavity 714 flows to the second cavity 10231 through the first filtering layer on the filtering box 711, and then, the water flows to the main water pump 210 through the second cavity 10231. The main water pump 210 is configured to generate a first water flow that flows through the filtering box water inlet portion 716, the first cavity 714, the filtering box 1023, and the main water pump 210 sequentially. The first state is a state of the filtering box 711 when the cleaning device 10 moves in a direction perpendicular to the gravity direction, or the first state is a state in which the cleaning device 10 is disposed at a certain tilting angle, and the cover part 720 cannot be opened under the gravity of the cover part 720 or an external force to expose the flow guiding opening 715.

When the filtering box 711 of the filtering assembly 710 is in the second state, the cover part 720 is opened to expose the flow guiding opening 715. The main water pump 210 is configured to guide at least a part of the water to flow to the main water pump 210 through the filtering box water inlet portion 716, the first cavity 714, the flow guiding opening 715, and the second cavity 10231 sequentially. In other words, the main water pump 210 is configured to guide the water in the pool to flow into the first cavity 714 through the filtering box water inlet portion 716. At least a part of the water in the first cavity 714 directly flows to the second cavity 10231 through the flow guiding opening 715. Another part of the water flows to the second cavity 10231 through the first filtering layer, and then, the water flows to the main water pump 210 through the second cavity 10231. The main water pump 210 generates a second water flow, and at least a part of the second water flow flows through the filtering box water inlet portion 716, the first cavity 714, the flow guiding opening 715, the filtering box cavity 1023, and the main water pump 210 sequentially.

The filtering box cavity 1023 is disposed in the cleaning device 10, so that the water can be concentrated in the second cavity 10231 and concentratedly flow into the main water pump 210 to improve the requirement for the amount of water flowing into the main water pump 210. In this way, the wall climbing, slope climbing, or operating performance of the cleaning device 10 is further improved. The filtering box cavity 1023 is provided with a water outlet (not shown in the figure). The water outlet communicates with the main water pump 210. The water outlet may be provided on a side wall of the filtering box cavity 1023, and the side wall is close to the main water pump 210, or the water outlet may be provided at other positions on the filtering box cavity 1023. This is not limited herein.

The flow guiding opening 715 may include one flow guiding sub-opening (not shown in the figure), or the flow guiding opening 715 may include more than two flow guiding sub-openings, such as two flow guiding sub-openings, three flow guiding sub-openings, or a plurality of flow guiding sub-openings. A quantity of flow guiding sub-openings may be determined based on an actual situation. When there are a plurality of flow guiding sub-openings, an amount of water flowing out from the flow guiding opening formed by the plurality of flow guiding sub-openings needs to be substantially equal to an amount of water flowing out from the flow guiding opening 715 formed by one flow guiding sub-opening to ensure the amount of water flowing out from the flow guiding opening 715 to be consistent. In this way, the requirement for the amount of water flowing into the main water pump 210 can always be met when the cleaning device 10 climbs the wall or the slope or when the first filtering layer is clogged to a certain extent, so that the cleaning device 10 can stably climb the wall or the slope or operate stably.

There may be one, two, three, or four flow guiding openings 715. This is not limited herein. The periphery of the filtering box 711 is hollow. The first filtering layer is located at a hollowed region. The flow guiding opening 715 may be provided at the hollowed region of the filtering box 711 or at a position of the filtering box 711 other than the hollowed region, or the flow guiding opening 715 is provided on the first filtering layer. When the flow guiding opening 715 is provided on the first filtering layer, the periphery of the flow guiding opening 715 is defined by the filtering box 711, so that the cover part 720 more stably covers the flow guiding opening 715 or is opened to expose the flow guiding opening 715.

In some embodiments, the cover part 720 may be driven by a drive assembly (not shown in the figure). The drive assembly is connected to the cover part 720, so that the cover part 720 covers the flow guiding opening 715 or is opened to expose the flow guiding opening 715. The drive assembly may include a drive motor (not shown in the figure). The drive motor is connected to the cover part 720 to control the cover part 720 to move. Alternatively, a related structure is disposed on the cover part 720, and the cover part 720 is driven by the cover part 720 and the related structure, so that the cover part 720 covers the flow guiding opening 715 or is opened to expose the flow guiding opening 715. In other embodiments, the cover part 720 may cover the flow guiding opening 715 or be opened to expose the flow guiding opening 715 in other manners. This is not limited herein. The cover part 720 may be a cover plate, a flipping plate, or the like.

The cover part 720 may be mounted on the filtering box 711. The cover part 720 may be mounted on the filtering box 711 through pivoting, telescoping, hinging, or the like, to cover the flow guiding opening 715 or be opened to expose the flow guiding opening 715.

Figure 10:
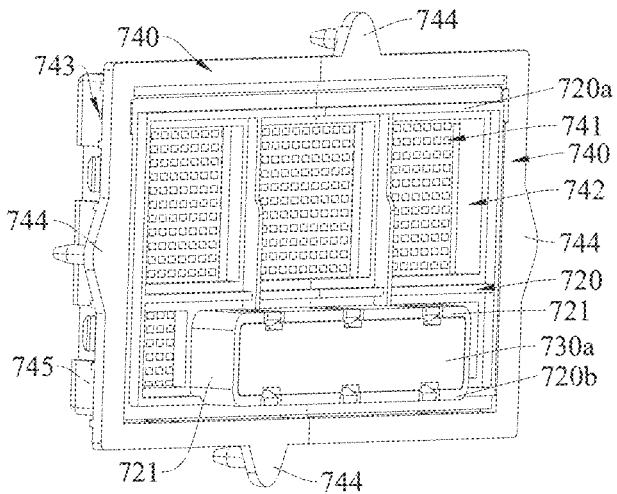
FIG. 10 is a partial schematic view of a filtering assembly of a cleaning device in a first state according to a first embodiment of the present disclosure.
Figure 11:
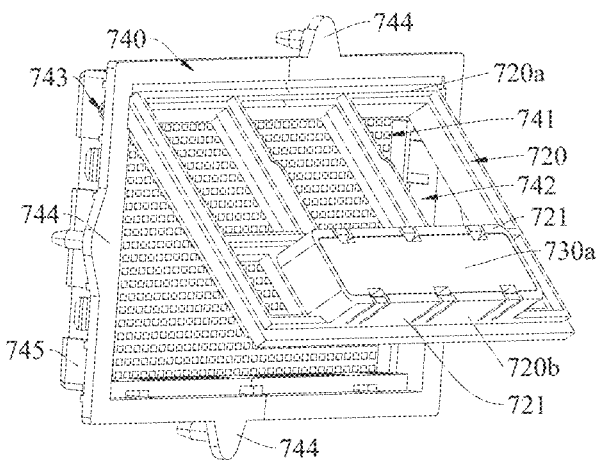
FIG. 11 is a partial schematic view of a filtering assembly of a cleaning device in a second state according to a first embodiment of the present disclosure.

FIG. 10 is a partial schematic view of the filtering assembly of the cleaning device in the first state according to the first embodiment of the present disclosure. FIG. 11 is a partial schematic view of the filtering assembly of the cleaning device in the second state according to the first embodiment of the present disclosure. With reference to FIG. 1 to FIG. 5, in some embodiments, the cover part 720 is pivotally connected to the filtering box 711. When the cover part 720 is pivotally connected to the filtering box 711, it is more labor-saving for the cover part 720 to cover the flow guiding opening 715 or be opened to expose the flow guiding opening 715. The filtering assembly 710 further includes adjustment parts 730a and 730b mounted on the cover part 720. The adjustment parts 730a and 730b are away from a pivoting joint between the cover part 720 and the filtering box 711. Mounting positions of the adjustment parts 730a and 730b are away from the pivoting joint between the cover part 720 and the filtering box 711. The adjustment parts 730a and 730b assist the cover part 720 in covering the flow guiding opening 715 or being opened to expose the flow guiding opening 715.

In the first state, a pivot point at which the cover part 720 rotates around the filtering box 711 is located on an action line of a sum of gravity and a buoyancy force applied to the cover part 720 and the adjustment parts 730a and 730b. In other words, a rotation moment of the cover part 720 around the filtering box 711 is zero. Therefore, the cover part 720 does not pivot and always remains in a vertical state to better cover the flow guiding opening 715.

In the second state, the filtering assembly 710 tilts or is flipped and inverted, and the pivot point at which the cover part 720 rotates around the filtering box 711 deviates from the action line of the sum of the gravity and the buoyancy force applied to the cover part 720 and the adjustment parts 730a and 730b. In other words, the rotation moment of the cover part 720 around the filtering box 711 is not zero, so that the cover part 720 has the rotation moment for rotating around the filtering box 711 to force the cover part 720 to rotate to expose the flow guiding opening 715. The adjustment parts 730a and 730b may have different densities, provided that the adjustment parts 730a and 730b can assist the cover part 720 in moving. Specific structures of the adjustment parts 730a and 730b are not limited herein. In another second state, when the first filtering layer of the filtering assembly 710 is clogged, and the filtering assembly 710 does not obviously tilt or is not flipped and inverted, a large pressure difference between the filtering box cavity 1023 and the first cavity 714 is formed due to a pumping action of the main water pump 210. In response to the pressure difference, the cover part 720 can be opened to expose the flow guiding opening 715 to balance the pressure difference.

Positions of the adjustment parts 730a and 730b on the cover part 720 are limited, so that the cover part 720 can more quickly cover the flow guiding opening 715 or be opened to expose the flow guiding opening 715, and the amount of water flowing out from the first cavity 714 is increased to improve the amount of water flowing into the main water pump 210. In this way, the wall climbing, slope climbing, or operating performance of the cleaning device 10 is improved. In addition, the cover part 720 can be switched autonomously between the first state and the second state to reduce usage of the drive assembly. This reduces costs.

Specifically, the cover part 720 includes a first end 720a and a second end 720b opposite to each other. When the filtering assembly 710 is in the first state or the second state, the first end 720a is located at an uppermost end of the cover part 720, and the second end 720b is located at a lowermost end of the cover part 720. Both the first end 720a and the second end 720b may be configured to be pivotally connected to the filtering box 711. However, because the first end 720a and the second end 720b are disposed at different positions, a force applied to the cover part 720 when the first end 720a is pivotally connected to the filtering box 711 is different from a force applied to the cover part 720 when the second end 720b is pivotally connected to the filtering box 711. To close the flow guiding opening 715 in the first state and open the flow guiding opening 715 in the second state, when the first end 720a or the second end 720b is pivotally connected to the filtering box 711, the positions of the adjustment parts 730a and 730b need to be adjusted to adjust a force applied to the cover part 720. Based on this, the following describes and analyzes specific results when the first end 720a or the second end 720b is pivotally connected to the filtering box 711.

Embodiment 1

In the Embodiment 1, the first end 720a is pivotally connected to the filtering box 711, and the second end 720b pivots around the first end 720a to be away from or abut against the filtering box 711 to open or close the flow guiding opening 715. In this case, the filtering assembly 710 is entirely located underwater, that is, the filtering assembly 710 is entirely located at a position under the water surface, and the gravity of the adjustment part 730a is greater than a buoyancy force.

Specifically, the first end 720a is pivotally connected to the filtering box 711, and the adjustment part 730a is away from a pivoting joint between the first end 720a and the filtering box 711. Because the gravity of the adjustment part 730a is greater than the buoyancy force, the second end 720b can pivot around the first end 720a to be away from the filtering box 711, so that the cover part 720 is opened to expose the flow guiding opening 715. Alternatively, the second end 720b can pivot around the first end 720a to abut against the filtering box 711, so that the cover part 720 covers the flow guiding opening 715. The gravity of the adjustment part 730a is much greater than the buoyancy force applied to the cover part 720 underwater. When the filtering box 711 is in the first state, a gravity center of the cover part 720 is changed by using the adjustment part 730a. In this way, a certain preload force may be formed in a gravity direction of the cover part 720. The cover part 720 can be attached to the filtering box 711 under the preload force. When the filtering box 711 is in the second state, the second end 720b pivots around the first end 720b to be away from the filtering box 711 under the gravity of the cover part 720 and the gravity of the adjustment part 730a.

The first end 720a is pivotally connected to the filtering box 711, the second end 720b pivots around the first end 720a to be away from or abut against the filtering box 711, and the gravity of the adjustment part 730a is greater than the buoyancy force. This increases a speed at which the cover part 720 covers the flow guiding opening 715 or is opened to expose the flow guiding opening 715, facilitates autonomous switching of the cover part 720 between the first state and the second state, reduces usage of the drive assembly, and reduces costs.

Optionally, in this embodiment, a density of the adjustment part 730a is greater than 1 g/cm³. The density of the adjustment part 730a may be 1.1 g/cm³, 2 g/cm³, 3 g/cm³, 3.4 g/cm³, 4.3 g/cm³, or the like. This is not limited herein. In other words, the density of the adjustment part 730a needs to be greater than the density of water. When the filtering box 711 is in the first state, the gravity of the cover part 720 is changed depending on the adjustment part 730a, so that the cover part 720 extends along the gravity direction, that is, the cover part 720 remains in a vertical state. In this case, the cover part 720 can cover the flow guiding opening 715. In addition, when the filtering box 711 is in the second state, the cover part 720 can be opened under the gravity of the cover part 720 and the gravity of the adjustment part 730a to expose the flow guiding opening 715.

The density of the adjustment part 730a is defined, so that the cover part 720 can quickly cover the flow guiding opening 715 or be opened to expose the flow guiding opening 715. The adjustment part 730a may be a counterweight block (not shown in the figure). The counterweight block may be a metal block, an alloy block, a stone, or the like. This is not limited herein.

More specifically, a ratio of a distance between a center of the adjustment part 730a and the first end 720a to a distance between the center of the adjustment part 730a to the second end 720b is less than 1. The distance between the center of the adjustment part 730a and the first end 720a is S1. The distance between the center of the adjustment part 730a and the second end 720b is S2. The ratio of S1 to S2 is less than 1. A position relationship between the adjustment part 730a and the first end 720a and a position relationship between the adjustment part 730a and the second end 720b are limited, and a position of the gravity center of the cover part 720 is adjusted, so that the preload force is applied to the cover part 720 in the first state. Therefore, the cover part 720 is tightly attached to the filtering box 711.

In some specific application scenarios, the adjustment part 730a protrudes from an inner side surface 725 of the cover part 720, and the inner side surface 725 faces the first cavity 714. When the filtering box 711 is in the first state, an included angle between the gravity direction and a connection line between a gravity center of the adjustment part 730a and a pivoting center of the cover part 720 is an acute angle. The adjustment part 730a may be detachably or fixedly connected to the cover part 720. The detachable connection may be clamping, inserting, or bolt fastening. That the included angle between the gravity direction and the connection line between the gravity center of the adjustment part 730a and the pivoting center of the cover part 720 is the acute angle means that the gravity center of the adjustment part 730a is higher than that of the side surface that is of the cover part 720 and that faces the first cavity 714 to increase the preload force applied to the cover part 720 in the first state, so that the speed at which the cover part 720 covers the flow guiding opening 715 is increased. In addition, the cover part 720 more easily pivots to be away from the flow guiding opening 715, so that the speed at which the cover part is opened to expose the flow guiding opening 715 is increased.

Further, the cover part 720 is provided with an adjustment part mounting portion 721. The adjustment part mounting portion 721 provides a mounting position for the adjustment part 730a. The adjustment part 730a may be disposed in the adjustment part mounting portion 721 through clamping, inserting, or bolt fastening.

Embodiment 2

Figure 12:
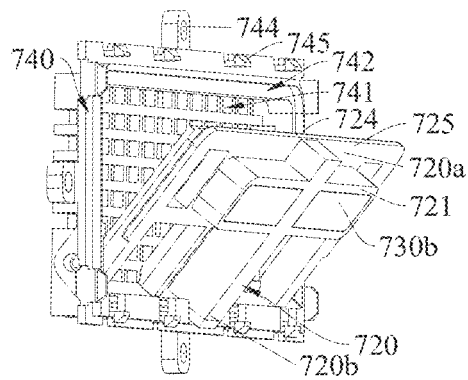
FIG. 12 is a partial schematic view of a filtering assembly of a cleaning device in a second state according to a first embodiment of the present disclosure.
Figure 13:
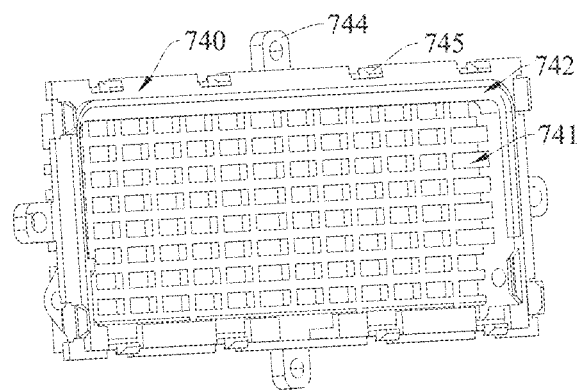
FIG. 13 is a schematic structural view of a mounting bracket of a filtering assembly of a cleaning device according to a second embodiment of the present disclosure.

FIG. 12 is a partial schematic view of the filtering assembly of the cleaning device in the second state according to the first embodiment of the present disclosure. FIG. 13 is a schematic structural view of a mounting bracket of the filtering assembly of the cleaning device according to the second embodiment of the present disclosure. With reference to FIG. 6 and FIG. 7, the second end 720b is pivotally connected to the filtering box 711. The first end 720a pivots around the second end 720b to be away from or abut against the filtering box 711 to open or close the flow guiding opening 715. In this case, the filtering assembly 710 is entirely located underwater, that is, the filtering assembly 710 is entirely located at a position under the water surface, and a buoyancy force applied to the adjustment part 730b is greater than the gravity.

Specifically, the second end 720b is pivotally connected to the filtering box 711, and the adjustment part 730b is away from a pivoting joint between the second end 720b and the filtering box 711. The first end 720a can pivot around the second end 720b to be away from the filtering box 711, so that the cover part 720 is opened to expose the flow guiding opening 715. Alternatively, the first end 720a can pivot around the second end 720b to abut against the filtering box 711. Because the buoyancy force applied to the adjustment part 730b is greater than the gravity, the cover part 720 can cover the flow guiding opening 715. The buoyancy force applied to the adjustment part 730b is much greater than the gravity of the cover part 720 in the water. When the filtering box 711 is in the first state, the cover part 720 extends along the gravity direction under the buoyancy force applied to the adjustment part 730b. In this case, the cover part 720 can cover the flow guiding opening 715. When the filtering box 711 is in the second state, the second end 720b pivots around the first end 720a to be away from the filtering box 711 under the gravity of the cover part 720.

The first end 720a is pivotally connected to the filtering box 711, the second end 720b pivots around the first end 720a to be away from or abut against the filtering box 711, and the gravity of the adjustment part 730b is greater than the buoyancy force. This increases a speed at which the cover part 720 covers the flow guiding opening 715 or is opened to expose the flow guiding opening 715, facilitates autonomous switching of the cover part 720 between the first state and the second state, reduces usage of the drive assembly, and reduces costs.

Optionally, in this embodiment, a density of the adjustment part 730b is less than 1 g/cm$^3$. The density of the adjustment part 730b may be 0.9 g/cm$^3$, 0.8 g/cm$^3$, 0.64 g/cm$^3$, 0.54 g/cm$^3$, 0.1 g/cm$^3$, or the like. This is not limited herein. In other words, the density of the adjustment part 730b needs to be less than the density of water. When the filtering box 711 is in the first state, the cover part 720 is in the vertical state under the buoyancy force applied to the adjustment part 730b, so that the cover part 720 covers the flow guiding opening 715. In addition, when the filtering box 711 is in the second state, the cover part 720 may be opened under the gravity of the cover part 720 to expose the flow guiding opening 715.

The density of the adjustment part 730b is defined, so that the cover part 720 can be adjusted to quickly cover the flow guiding opening 715. The adjustment part 730b may be a hollow structure, foam, plastic, an air bag, or the like. This is not limited herein. The hollow structure may be a hollow box-like structure. In this embodiment, the adjustment part 730b is foam.

More specifically, in the Embodiment 2, the filtering assembly 710 further includes a moving part 731. The cover part 720 further includes an accommodating channel 722. The accommodating channel 722 is provided between the first end 720a and the second end 720b. A center line of the accommodating channel 722 intersects with a plane on which the first end 720a or the second end 720b is located. The moving part 731 is accommodated in the accommodating channel 722 and can move along the accommodating channel 722.

In a process of switching the filtering box 711 from the first state to the second state or a process of switching the filtering box 711 from the second state to the first state, the moving part 731 is accommodated in the accommodating channel 722 and can move along the accommodating channel 722. A position of the moving part 731 can be changed to change a position of the gravity center of the cover part 720, so that the cover part 720 can quickly cover the flow guiding opening 715 or close the flow guiding opening 715. This improves the wall climbing, slope climbing, or operating performance of the cleaning device 10. The moving part 731 may be a rolling part (not shown in the figure). The rolling part rolls in the accommodating channel 722, so that friction between the rolling part and the accommodating channel 722 can be reduced, and the position of the gravity center of the cover part 720 can be changed more quickly. The rolling part may be a rolling ball. A density of the rolling ball may be greater than 1 g/cm$^3$. A size of the rolling ball may be determined based on an actual situation. This is not limited herein.

The accommodating channel 722 is provided between the first end 720a and the second end 720b, and the center line of the accommodating channel 722 intersects with the plane on which the first end 720a is located, that is, the accommodating channel 722 is provided close to the first end 720a. Alternatively, the accommodating channel 722 is provided between the first end 720a and the second end 720b, and the center line of the accommodating channel 722 intersects with the plane on which the second end 720b is located, that is, the accommodating channel 722 is provided close to the second end 720b. The accommodating channel 722 may be provided at any angle at the first end 720a or the second end 720b.

In some embodiments, the center line of the accommodating channel 722 vertically intersects with the plane on which the first end 720a or the second end 720b is located. The center line of the accommodating channel 722 vertically intersects with the plane on which the first end 720a is located, or the center line of the accommodating channel 722 vertically intersects with the plane on which the second end 720b is located. When the moving part 731 moves along the accommodating channel 722, the gravity center can be changed along a direction from the first end 720a to the second end 720b, so that the gravity center of the cover part 720 can be changed regularly, which is simple and can be implemented easily.

In some embodiments, the cover part 720 includes the inner side surface 725 facing the first cavity 714. The accommodating channel 722 extends from the second end 720b to the first end 720a along a direction close to the inner side surface 725. In other words, the accommodating channel 722 tilts. When the filtering box 711 is in the second state, the moving part 731 moves, under the gravity, from the second end 720b to the first end 720a along the accommodating channel 722 that tilts. In this case, the gravity center of the cover part 720 moves forward, and the gravity of the cover part 720 is greater than the buoyancy force applied to the cover part 720, so that the cover part 720 is opened to expose the flow guiding opening 715.

A tilting direction of the accommodating channel 722 is changed, so that the moving part 731 can conveniently move, and the gravity center of the cover part 720 can be quickly changed. In this way, the cover part 720 can be quickly opened to expose the flow guiding opening 715 or quickly cover the flow guiding opening 715.

In the Embodiment 1, the Embodiment 2, or any other specific embodiments, the cover part 720 may be directly pivotally connected to a side wall of the filtering box 711. However, to implement stable and firm mounting, the cover part 720 may be indirectly pivotally connected to the side wall of the filtering box 711 by using other mounting parts, such as a mounting bracket 740.

In some embodiments, as shown in FIG. 1 to FIG. 13, the mounting bracket 740 is disposed on the side wall of the filtering box 711. At least a part of the mounting bracket 740 covers the flow guiding opening 715. The part of the mounting bracket 740 covers the flow guiding opening 715, and the part is provided with a plurality of grill holes 741. The plurality of grill holes 741 communicate with the flow guiding opening 715. The cover part 720 is movably mounted on the mounting bracket 740.

Specifically, the mounting bracket 740 is detachably connected to or fixed to the side wall of the filtering box 711. In a process of mounting the mounting bracket 740 to the side wall of the filtering box 711, the mounting bracket 740 covers at least a part of the flow guiding opening 715. The part of the mounting bracket 740 covers the flow guiding opening 715, and the part is provided with a plurality of grill holes 741. The plurality of grill holes 741 communicate with the flow guiding opening 715. At least a part of the water in the first cavity 714 flows out through the flow guiding opening 715 and the grill holes 741 sequentially. The plurality of grill holes 741 are provided on the mounting bracket 740 to prevent large debris (leaves or the like) from entering the main water pump 210 when the cover part 720 is opened, so that the main water pump impeller 212 of the main water pump 210 is prevented from being damaged. Sizes and shapes of the grill holes 741 are not limited, provided that an actual use requirement can be met. In this embodiment, each of the plurality of grille holes 741 is square.

Further, the mounting bracket 740 is detachably mounted to the side wall of the filtering box 711. The detachable connection may be clamping, bolt fastening, or inserting. In this embodiment, the periphery of the mounting bracket 740 is provided with a plurality of mounting portions 744. Each of the plurality of mounting portions 744 is provided with a mounting hole (not shown in the figure). A fixed part extends through the mounting hole to be fixed to the side wall of the filtering box 711. In addition, a plurality of mounting buckles 745 are provided on the periphery of the mounting bracket 740. The plurality of mounting buckles 745 are inserted into the flow guiding opening 715 to be clamped to a side wall of the flow guiding opening 715. The mounting portions 744 mate with the mounting buckles 745, so that the mounting bracket 740 is mounted to the side wall of the filtering box 711 more stably. This improves stability of the filtering assembly 710. Positions and quantities of the mounting bracket 740 and the mounting buckles 745 are determined based on an actual situation. This is not limited herein.

In addition, when the filtering box 711 is provided with the mounting bracket 740, the cover part 720 may be movably mounted on the mounting bracket 740. The movable connection may be a rotatable connection. The cover part 720 is rotatably connected to the mounting bracket 740.

In some specific embodiments, a side surface of the mounting bracket 740 faces the first cavity 714, and the side surface is recessed to form the accommodating cavity 742. A side wall of the accommodating cavity 742 is provided with a pivoting portion mounting groove 743. The cover part 720 is movably accommodated in the accommodating cavity 742. The cover part 720 is provided with a pivoting portion 723 protruding from the cover part 720. A stop position-limiting protrusion is provided below the pivoting portion 723. The pivoting portion 723 is pivotally mounted in the pivoting portion mounting groove 743. The stop position-limiting protrusion moves with the cover part 720 to stop on the side wall.

The accommodating cavity 742 is recessedly provided in the side surface of the mounting bracket 740, and the side surface faces the first cavity 714. The accommodating cavity 742 can be configured to accommodate the cover part 720. The accommodating cavity 742 communicates with the pivoting portion mounting groove 743. The pivoting portion 723 is fixedly or detachably mounted to the cover part 720. When the cover part 720 is movably mounted in the accommodating cavity 742, the pivoting portion 723 is pivotally mounted in the pivoting portion mounting groove 743, so that the cover part 720 rotates. The stop position-limiting protrusion is provided below the pivoting portion 723. The pivoting portion 723 and the stop position-limiting protrusion are detachably or fixedly connected to each other. The stop position-limiting protrusion has a stopping and position-limiting function. When the pivoting portion 723 pivots, the stop position-limiting protrusion also rotates with the pivoting portion 723. When the cover part 720 rotates to reach a certain angle, the stop position-limiting protrusion stops on the side wall of the accommodating cavity 742, so that the cover part 720 stops rotating, and a rotation angle of the cover part 720 is limited.

The accommodating cavity 742, the pivoting portion mounting groove 743, the pivoting portion 723, and stop position-limiting protrusion cooperate with each other to limit the rotation angle of the cover part 720, so that the cover part 720 is prevented from being adsorbed to the side wall of the filtering box 711 due to the excessively large rotation angle of the cover part 720, and therefore, covering performance of the cover part 720 is not affected.

When the filtering box 711 is in the second state, an included angle between the cover part 720 and the filtering box 711 can be limited by the stop position-limiting protrusion. The included angle between the cover part 720 and the filtering box 711 is greater than or equal to 30° and less than or equal to 100°. The included angle between the cover part 720 and the filtering box 711 may be 30°, 43°, 54°, 65°, 76°, 87°, 90°, 98°, 100°, or the like. This is not limited herein. A range of the included angle between the cover part 720 and the filtering box 711 is limited, so that at least a part of the water in the first cavity 714 can flow out through the flow guiding opening 715 to increase the amount of water flowing out of the filtering box 711, and a risk that the cover part 720 is adsorbed onto the side wall of the filtering box 711 is reduced. In this embodiment, when the filtering box 711 is in the first state, the cover part 720 is disposed vertically relative to the filtering box 711 under the stop position-limiting protrusion, that is, the included angle between the cover part 720 and the filtering box 711 is 90°.

Optionally, a lap portion 724 extends from an edge of the cover part 720. The lap portion 724 abuts against the inner side surface 725 of the mounting bracket 740 when the cover part 720 is accommodated in the accommodating cavity 742. The lap portion 724 is fixedly or detachably connected to the cover part 720. The lap portion 724 is disposed at the edge of the cover part 720. When the filtering box 711 is in the first state, the lap portion 724 of the cover part 720 may abut against the inner side surface 725 of the mounting bracket 740 when the cover part 720 is accommodated in the accommodating cavity 742.

In the above manner, sealing performance of the cover part 720 covering the flow guiding opening 715 is improved, so that water flowing into the filtering box 711 through a gap between the cover part 720 and the mounting bracket 740 is reduced, and therefore, cleaning efficiency of the cleaning device 10 is not affected.

Figure 14:
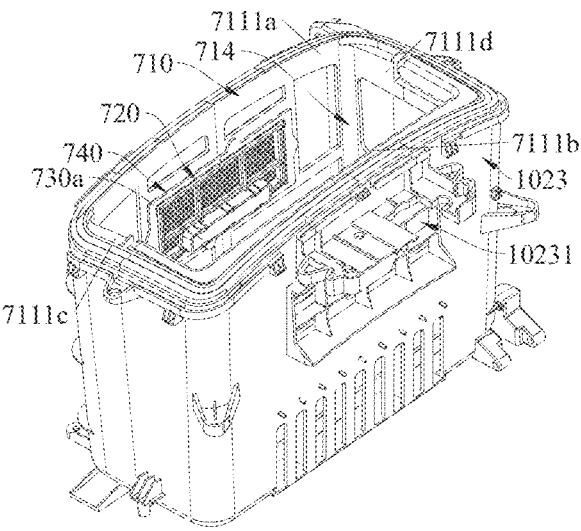
FIG. 14 is a partial schematic view of a cleaning device according to a first embodiment of the present disclosure.
Figure 15:
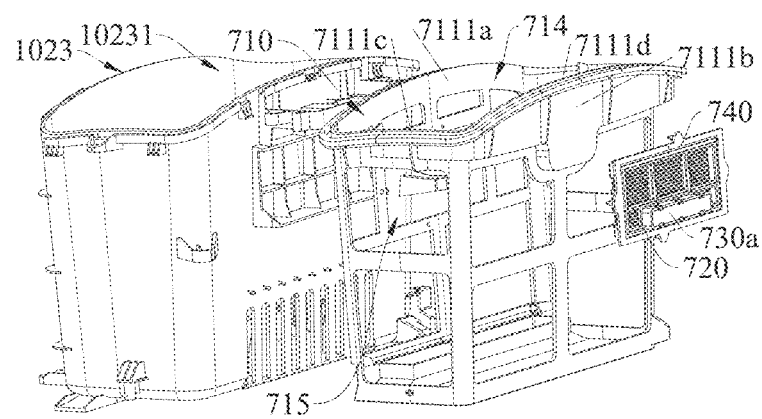
FIG. 15 is a partial exploded view of a cleaning device according to a first embodiment of the present disclosure.

FIG. 14 is a partial schematic view of the cleaning device according to the first embodiment of the present disclosure. FIG. 15 is a partial exploded view of the cleaning device according to the first embodiment of the present disclosure. With reference to FIG. 1 to FIG. 9, in some actual application scenarios, the filtering box 711 of the filtering assembly 710 in embodiments of the present disclosure is substantially square. The filtering box 711 has at least two configurations. In the first configuration, the filtering box 711 has an opening. The filtering box 711 includes a first side surface 7111a, a second side surface 7111b, a third side surface 7111c, and a fourth side surface 7111d. The first side surface 7111a, the second side surface 7111b, the third side surface 7111c, and the fourth side surface 7111d are jointly enclosed to form the opening. The first side surface 7111a and the second side surface 7111b are disposed opposite to each other. The third side surface 7111c and the fourth side surface 7111d are disposed opposite to each other. The first side surface 7111a is close to a front of a moving direction of the cleaning device 10. The flow guiding opening 715 may be provided on at least one of the first side surface 7111a, the second side surface 7111b, the third side surface 7111c, or the fourth side surface 7111d. At least one of the first side surface 7111a, the second side surface 7111b, the third side surface 7111c, or the fourth side surface 7111d may be provided with one, two, or more than two flow guiding openings 715. This is not limited herein. In other words, the cover part 720 may be pivotally connected to at least one of the first side surface 7111a, the second side surface 7111b, the third side surface 7111c, or the fourth side surface 7111d. The cover part 720 covers a corresponding flow guiding opening 715 or is opened to expose a corresponding flow guiding opening 715.

When the flow guiding opening 715 is provided on the first side surface 7111a, the cover part 720 is disposed on the first side surface 7111a and pivots toward the interior of the filtering box 711. When the flow guiding opening 715 is provided on both the second side surface 7111b and the third side surface 7111c, the cover parts 720 on the second side surface 7111b and the third side surface 7111c are provided with the pivoting portions 723. The pivoting portion 723 is vertically disposed on the mounting bracket 740 or the side wall of the filtering box 711. The cover part 720 may pivot toward the interior or the exterior of the filtering box 711. Certainly, in other embodiments, the cover part 720 may be disposed in other manners. This is not limited herein. When the flow guiding opening 715 is provided on the fourth side surface 7111d, the cover part 720 may be disposed on the fourth side surface 7111d and pivot toward the periphery of the filtering box 711.

In the second configuration, the filtering box 711 has no opening. The filtering box 711 includes a first side surface 7111a, a second side surface 7111b, a third side surface 7111c, a fourth side surface 7111d, and a fifth side surface 7111e. The fifth side surface 7111e covers an opening formed by enclosure of the first side surface 7111a, the second side surface 7111b, the third side surface 7111c, and the fourth side surface 7111d. The fifth side surface 7111e is fixedly or detachably connected to at least one of the first side surface 7111a, the second side surface 7111b, the third side surface 7111c, or the fourth side surface 7111d. The first side surface 7111a, the second side surface 7111b, the third side surface 7111c, the fourth side surface 7111d, and the fifth side surface 7111e are disposed to ensure the filtering box 711 to be in a closed state. The flow guiding opening 715 may be provided on at least one of the first side surface 7111a, the second side surface 7111b, the third side surface 7111c, the fourth side surface 7111d, or the fifth side surface 7111e. In other words, the cover part 720 may be pivotally connected to at least one of the first side surface 7111a, the second side surface 7111b, the third side surface 7111c, the fourth side surface 7111d, or the fifth side surface 7111e. The cover part 720 covers a corresponding flow guiding opening 715 or is opened to expose a corresponding flow guiding opening 715.

The cover part 720 may be disposed on the fifth side surface 7111e when the flow guiding opening 715 is provided on the fifth side surface 7111e. Alternatively, the cover part 720 may be disposed at a position on the cleaning device 10, and the position is close to the fifth side surface 7111e. In other words, the cover part 720 may pivotally rotate toward the interior or the exterior of the filtering box 711. Therefore, the position at which the cover part 720 is disposed is related to a structure of the filtering box 711, the position of the flow guiding opening 715, and the structure of the cleaning device 10. A structure of the cover part 720 may be determined and finely adjusted based on an actual situation, provided that the cover part 720 can cover the flow guiding opening 715 or be opened to expose the flow guiding opening 715. In this way, a thrust applied to the cleaning device 10 is improved, so that the wall climbing, slope climbing, or operating performance of the cleaning device 10 is improved. This improves user experience.

When the filtering assembly 710 is only provided with one flow guiding opening 715, the cover part 720 having the first configuration and the adjustment part 730a whose density is greater than 1 g/cm$^3$ may be disposed at the flow guiding opening 715, or the cover part 720 having the second configuration, the adjustment part 730b whose density is less than 1 g/cm$^3$, and the moving part 731 may be disposed at the flow guiding opening 715.

When the filtering assembly 710 is provided with two flow guiding openings 715, the cover part 720 having the first configuration and the adjustment part 730a whose density is greater than 1 g/cm$^3$ may be disposed at each of the two flow guiding openings 715, or the cover part 720 having the second configuration, the adjustment part 730b whose density is less than 1 g/cm$^3$, and the moving part 731 may be disposed at each of the two flow guiding openings 715, or the cover part 720 having the first configuration and the adjustment part 730a whose density is greater than 1 g/cm$^3$ may be disposed at one of the two flow guiding openings 715, and the cover part 720 having the second configuration, the adjustment part 730b whose density is less than 1 g/cm$^3$, and the moving part 731 may be disposed at the other one of the two flow guiding openings 715.

When the filtering assembly 710 is provided with three or more flow guiding openings 715, the type of the cover part 720 and the type of the adjustment part 730b disposed at each flow guiding opening 715 may be determined based on an actual situation. Details are not described herein again.

In addition, the shape of the flow guiding opening 715 may be regular or irregular. The regular shape may be a regular polygon, a circle, or the like. The irregular shape may be formed by an arc and a folded line. A shape of the cover part 720 may be the same as or different from that of the flow guiding opening 715. When the shape of the cover part 720 is different from the shape of the flow guiding opening 715, and the filtering box 711 is in the first state, the specific shape of the cover part 720 is not limited, provided that the cover part 720 can cover the flow guiding opening 715.

It may be understood that the cover part 720 of the filtering assembly 710 in this embodiment of the present disclosure is further provided with a second filtering layer. When the cover part 720 is not opened, the second filtering layer filters out debris to prevent normal operation of the cleaning device 10 from being affected by the cover part 720. A specific position and a form of the second filtering layer are not limited herein, provided that a position at which the second filtering layer is provided avoids the positions at which the adjustment parts 730a and 730b are disposed.

The cover part 720 may be movably connected to the cleaning device 10. For example, the cover part 720 may be mounted on a component of the cleaning device 10 other than the filtering box 711 through pivoting, telescoping, hinging, or the like. The cover part 720 is configured to cover the flow guiding opening 715 or be opened to expose the flow guiding opening 715. When the cover part 720 is pivotally connected to the cleaning device 10, a structure of the cover part 720 is the same as the structure of the above cover part 720 that is pivotally connected to the filtering box 711. Details are not described herein again. In other words, the cover part 720 may be disposed at various positions. A specific position of the cover part 720 is determined based on an actual situation.

As shown in FIG. 1 to FIG. 9, FIG. 14, and FIG. 15, in some embodiments, the cleaning device 10 includes a filtering assembly 710. The filtering assembly 710 is the filtering assembly 710 described in the above embodiments. Details are not described herein again. The filtering assembly 710 is disposed, so that the impact on the cleaning effect of the cleaning device 10 can be reduced, and the amount of water flowing into the main water pump 210 can be increased. In this way, the thrust applied to the cleaning device 10 is increased, so that wall climbing, slope climbing, or operating performance of the cleaning device 10 is improved. This improves user experience.

In an embodiment, the filtering box water inlet portion 716 is formed in the filtering box 711. The filtering box water inlet portion 716 communicates with the first cavity 714. In other words, water flows into the first cavity 714 through the filtering box water inlet portion 716. The cleaning device 10 further includes the main water pump 210. The main water pump 210 is disposed outside the filtering box 711. The main water pump 210 communicates with the first cavity 714 of the filtering box 711. The main water pump 210 provides a driving force to drive the water to flow and guide a flow direction of the water.

When the filtering assembly 710 is in the first state, the cover part 720 covers the flow guiding opening 715. The main water pump 210 is configured to guide the water to flow into the main water pump 210 sequentially through the filtering box water inlet portion 716, the first cavity 714, and the first filtering layer. In other words, the main water pump 210 is configured to guide the water in the pool to flow into the first cavity 714 through the filtering box water inlet portion 716, and the water in the first cavity 714 flows into the main water pump 210 through the first filtering layer on the filtering box 711.

When the filtering assembly 710 is in the second state, the cover part 720 is opened to expose the flow guiding opening 715. The main water pump 210 is configured to guide at least a part of the water to flow into the main water pump 210 sequentially through the filtering box water inlet portion 716, the first cavity 714, and the flow guiding opening 715.

In other words, the main water pump 210 is configured to guide the water in the pool to flow into the first cavity 714 through the filtering box water inlet portion 716, at least a part of the water in the first cavity 714 directly flows into the main water pump 210 through the flow guiding opening 715, and another part of the water flows into the main water pump 210 through the first filtering layer.

Therefore, the main water pump 210 provides a driving force to drive the water to flow and limits the flow direction of the water, and a requirement for the amount of water flowing into the main water pump 210 can always be met. In this way, stable wall climbing, slope climbing, or operating performance of the cleaning device 10 can be maintained.

In an embodiment, the cleaning device 10 includes the filtering box cavity 1023. A second cavity 10231 is formed in the filtering box cavity 1023. The filtering assembly 710 is disposed inside the second cavity 10231. The second cavity 10231 communicates with the first cavity 714 of the filtering box 711 in the filtering assembly 710. For example, the second cavity 10231 may communicate with the first cavity 714 through the first filtering layer and the flow guiding opening 715. The main water pump 210 is disposed outside the filtering box cavity 1023. The filtering box water inlet portion 716 is formed between the filtering box 711 and the filtering box cavity 1023. The filtering box water inlet portion 716 communicates with the first cavity 714. In other words, water flows into the first cavity 714 through the filtering box water inlet portion 716. A position and a disposition manner of the filtering box water inlet portion 716 are not limited herein, provided that the water can directly enter the first cavity 714 through the filtering box water inlet portion 716.

In an embodiment, the cover part 720 is pivotally connected to the filtering box cavity 1023. A structure of the cover part 720 pivotally connected to the filtering box cavity 1023 is the same as a structure of the cover part 720 pivotally connected to the filtering box 711. Details are not described herein again. The cover part 720 is disposed on the filtering box cavity 1023 to reduce a resistance applied by the cover part 720 against the water flow, so that the water can flow out of the filtering box 711 more smoothly. For example, the cover part 720 may be disposed on the side wall of the filtering box cavity 1023 to cover the flow guiding opening 715 or be opened to expose the flow guiding opening 715.

In a process in which the cover part 720 is opened to expose the flow guiding opening 715, when the cleaning device 10 is switched from the second state to the first state, the cover part 720 can be automatically reset due to the structure thereof, so that the cover part 720 covers the flow guiding opening 715. Certainly, a reset assembly may be disposed between the cover part 720 and the filtering box 711 or between the cover part 720 and the filtering box cavity 1023. Resetting can be implemented quickly by the reset assembly. The reset assembly may be a torsion spring, a spring, a tension spring, or the like. This is not limited herein.

In an embodiment, the cleaning device 10 further includes a flipping cover (not shown in the figure). The filtering box cavity 1023 has an opening (not shown in the figure). The flipping cover covers the opening to seal the filtering box cavity 1023. The flipping cover is disposed on the top of the filtering box cavity 1023. The flow guiding opening 715 is provided at the top of the filtering box 711. In this case, the filtering box 711 is partially hollowed and is provided with the flow guiding opening 715. The cover part 720 is movably connected to the flipping cover to cover the flow guiding opening 715 or be opened to expose the flow guiding opening 715 of the filtering box 711. In other words, the cover part 720 may be disposed on the flipping cover in addition to the filtering box cavity 1023.

In other embodiments, when the top of the filtering box 711 includes the fifth side surface 7111*e*, the cover part 720 may be movably mounted on a top cover housing (not shown in the figure) of the cleaning device 10. The top cover housing is an outermost housing of the cleaning device 10. When the top cover housing is opened, the filtering assembly 710 can be removed from the cleaning device 10 and may be cleaned or replaced. The cover part 720 covers the flow guiding opening 715 on the fifth side surface 7111*e* or is opened to expose the flow guiding opening 715 on the fifth side surface 7111*e*.

In some embodiments, when the top of the filtering box 711 includes the fifth side surface 7111*e*, the flow guiding opening 715 is formed on the fifth side surface 7111*e*. The cover part 720 may be movably mounted on the fifth side surface 7111*e* to cover the flow guiding opening 715 on the fifth side surface 7111*e* or be opened to expose the flow guiding opening 715 on the fifth side surface 7111*e*.

In an embodiment, the cover part 720 is further provided with a second filtering layer (not shown in the figure). The second filtering layer communicates with the first cavity 714 and the second cavity 10231. The second filtering layer is configured to perform filtering. When the filtering assembly 710 is in the first state, the cover part 720 covers the flow guiding opening 715. The water in the pool can flow into the first cavity 714 through the filtering box water inlet portion 716. The water in the first cavity 714 flows into the second cavity 10231 through the first filtering layer on the filtering box 711 and the second filtering layer on the cover part 720. Then, the water flows into the main water pump 210 through the second cavity 10231. The second filtering layer is disposed on the cover part 720, so that the cleaning efficiency of the cleaning device 10 can be improved. A structure of the second filtering layer may be the same as or different from the structure of the first filtering layer. This is not limited herein.

In an embodiment, the main water pump 210 includes a main water pump impeller casing 215. An area of the flow guiding opening 715 of the filtering assembly 710 is larger than a cross-sectional area, for water entering, of the main water pump impeller casing 215. Because the area of the flow guiding opening 715 is larger than the cross-sectional area, for water entering, of the main water pump impeller casing 215, an area for water flowing out of the filtering assembly 710 is increased. In this way, the amount of water flowing out of the filtering assembly 710 is larger than the amount of water flowing into the main water pump 210 to ensure that the requirement for the amount of water flowing into the main water pump 210 is always met when the cleaning device climbs the wall or the slope or the first filtering layer is clogged, so that the stable wall climbing, slope climbing, or operating performance is maintained.

The main water pump 210 further includes a main water pump impeller 212 and a main water pump motor 211. An output end of the main water pump motor 211 is connected to the main water pump impeller 212. The main water pump motor 211 drives the main water pump impeller 212 to rotate inside the main water pump impeller casing 215. The main water pump motor 211 of the main water pump 210 drives the main water pump impeller 212 to rotate, so that the water can flow into the main water pump impeller 212. In this way, a speed at which water flows out of the filtering assembly 710 is increased, and the cleaning efficiency of the cleaning device 10 for sewage in the pool is improved.

In some embodiments, a liquid inlet portion 103 includes a first water inlet 1031. The first water inlet 1031 is located at a lower front part of the cleaning device body 101. The first water inlet 1031 is configured to perform both underwater cleaning and water surface cleaning. When the cleaning device 10 performs underwater cleaning, the first water inlet 1031 is located under a liquid surface 30 and can allow garbage under the liquid surface 30 to be sucked. When the cleaning device 10 performs water surface cleaning, the first water inlet 1031 is at least partially exposed at the liquid surface 30 and can allow garbage floating at the liquid surface 30 to be sucked. In other words, the cleaning device body 101 can implement underwater cleaning and water surface cleaning through the first water inlet 1031 and by adjusting an attitude of the cleaning device 10 in a target region 40, so that cleaning efficiency is improved. Liquid sequentially flows through the first water inlet 1031, a first inlet, the filtering mechanism, an outlet, the drive mechanism, and a liquid outlet portion. In the above embodiment, when the cleaning device 10 performs underwater cleaning, the attitude of the cleaning device 10 is in a normal state. When the cleaning device 10 performs water surface cleaning, a front part of the cleaning device 10 is lifted upward to be exposed at the liquid surface 30, so that the first water inlet 1031 is at least partially exposed at the liquid surface 30.

In other embodiments, a liquid inlet portion 1031 includes a first water inlet 1031. The first water inlet 1031 is located at the bottom of the cleaning device body 101. The first water inlet 1031 is configured to perform both underwater cleaning and water surface cleaning. When the cleaning device 10 performs underwater cleaning, the first water inlet 1031 is located under a liquid surface 30 and faces a to-be-cleaned surface. When the cleaning device 10 performs water surface cleaning, the first water inlet 1031 is located under the liquid surface 30 but is close to the liquid surface 30 and faces the liquid surface 30. In other words, the cleaning device body 101 can implement underwater cleaning and water surface cleaning through the first water inlet 1031 and by adjusting an attitude of the cleaning device 10 in a target region 40, so that cleaning efficiency is improved. Liquid sequentially flows through the first water inlet 1031, a first inlet, the filtering mechanism, an outlet, the drive mechanism, and a liquid outlet portion. In the above embodiment, when the cleaning device 10 performs underwater cleaning, the attitude of the cleaning device 10 is in a normal state. When the cleaning device 10 performs water surface cleaning, the cleaning device 10 can be flipped, that is, the bottom of the cleaning device 10 faces upward. When the bottom of the cleaning device 10 faces upward, the filtering mechanism may be in a closed state, so that a risk of leaking garbage from the filtering mechanism is reduced.

In some embodiments, a liquid inlet portion 103 includes a first water inlet 1031 and a second water inlet 1032. The first water inlet 1031 is provided at the bottom of the cleaning device body 101. When the cleaning device 10 cleans the bottom or the wall of the pool, the first water inlet 1031 is close to the bottom or the wall of the pool to allow water to be sucked into the cleaning device 10. The liquid inlet portion 103 includes the second water inlet 1032. In other words, liquid enters the cleaning device body 101 through the second water inlet 1032. The second water inlet 1032 is provided at a side surface of a front part of the cleaning device body 101. When the cleaning device 10 performs water surface cleaning, the second water inlet 1032 is at least partially exposed at a liquid surface 30 and can allow garbage floating at the liquid surface 30 to be sucked. The cleaning device 10 can implement water surface cleaning through the second water inlet 1032. In addition, the first water inlet 1031 and the second water inlet 1032 may operate cooperatively to improve the cleaning efficiency of the cleaning device 10.

In some embodiments, a liquid inlet portion 103 includes a first water inlet 1031 and a second water inlet 1032. The first water inlet 1031 is provided at the bottom of the cleaning device body 101. The second water inlet 1032 is provided on a top part or a side part of the cleaning device body 101. The first water inlet 1031 is configured to clean the bottom or the wall of the pool. The second water inlet 1032 is configured to perform water surface cleaning. When the second water inlet 1032 is provided at the top part of the cleaning device body 101, the cleaning device 10 floats up to be close to a liquid surface 30, and an attitude of the cleaning device 10 is the same as that existing when the cleaning device moves on the bottom of the pool. The second water inlet 1032 is opened and is located close to and under the liquid surface under the action of the drive mechanism, such as the main water pump, so that garbage on the liquid surface enters the cleaning device 10 through the second water inlet 1032. When the second water inlet 1032 is provided on the side part of the cleaning device body 101, the attitude of the cleaning device 10 may be adjusted in a process in which the cleaning device 10 floats up to be close to the liquid surface 30 until the second water inlet 1032 faces the liquid surface 30 and is located under and close to the liquid surface 30.

In some embodiments, a liquid inlet portion 103 includes a first water inlet 1031 and a second water inlet 1032. In addition to being provided at a lower front part of the cleaning device body 101, the first water inlet 1031 may alternatively be provided at a lower front part of the cleaning device body 101 or a side surface of the cleaning device body 101. It should be noted that a position of the liquid inlet portion 103 is related to a position of the filtering mechanism. When the filtering mechanism is disposed at the front part of the cleaning device 10, the liquid inlet portion 103 is provided at the front part of the cleaning device 10. When the filtering mechanism is disposed at the rear part of the cleaning device 10, the liquid inlet portion 103 is provided at the rear part of the cleaning device 10. In some embodiments, the filtering mechanism includes the filtering assembly 710. The filtering assembly 710 has a filtering function. The filtering assembly 710 includes a first inlet. The first water inlet 1031 and the second water inlet 1032 are both in fluid communication with the first inlet of the filtering assembly 710. Under the action of the drive mechanism, at least a part of liquid sequentially flows through the first water inlet 1031, the first inlet, the filtering assembly 710, the drive mechanism, and a liquid outlet portion 104. At least a part of the liquid sequentially flows through the second water inlet 1032, the first inlet, the filtering assembly 710, the drive mechanism, and the liquid outlet portion 104. The first water inlet 1031 and the second water inlet 1032 both communicate with the first inlet to improve the cleaning efficiency of the cleaning device 10. The second water inlet 1032 and the first inlet may communicate with each other through a duct or the like.

The filtering mechanism may include one, two, three, or more filtering assemblies 710. A quantity of filtering assemblies 710 may be determined based on an actual requirement. When there are two, three, or more filtering assemblies 710, adjacent filtering assemblies 710 may be connected to each other in series or in parallel, which may be determined based on various use requirements of the cleaning device 10. This is not limited herein.

In some embodiments, the filtering mechanism includes one filtering assembly 710. The filtering assembly 710 includes the first inlet and a second inlet. The first water inlet 1031 is in fluid communication with the first inlet of the filtering assembly 710. The second inlet and the first inlet are located on different surfaces of the filtering mechanism. In other words, at least a part of the liquid sequentially flows through the first water inlet 1031, the first inlet, the filtering assembly 710, the drive mechanism, and the liquid outlet portion 104. The second water inlet 1032 communicates with the second inlet of the filtering assembly 710. In other words, at least a part of the liquid sequentially flows through the second water inlet 1032, the second inlet, the filtering assembly 710, the drive mechanism, and the liquid outlet portion 104. The first water inlet 1031 is in fluid communication with the first inlet, and the second water inlet 1032 is in fluid communication with the second inlet, so that liquid flow paths are increased. In this way, cleaning requirements of at least two operating conditions: underwater cleaning and water surface cleaning are met, thereby meeting various use requirements.

In some embodiments, the filtering mechanism includes two filtering assemblies 710. The two filtering assemblies 710 include a first filtering assembly 770 and a second filtering assembly 780. The first filtering assembly 770 is provided with the first inlet. The second filtering assembly 780 is provided with a second inlet. The first water inlet 1031 is in fluid communication with the first inlet of the first filtering assembly 770. In other words, at least a part of the liquid sequentially flows through the first water inlet 1031, the first inlet, the first filtering assembly 770, the drive mechanism, and the liquid outlet portion 104. The second water inlet 1032 is in fluid communication with the second inlet of the second filtering assembly 780. In other words, at least a part of the liquid sequentially flows through the second water inlet 1032, the second inlet, the second filtering assembly 780, the drive mechanism, and the liquid outlet portion 104. The two filtering assemblies 710 are configured to implement different liquid flow paths to improve the cleaning efficiency of the cleaning device 10.

Figure 16:
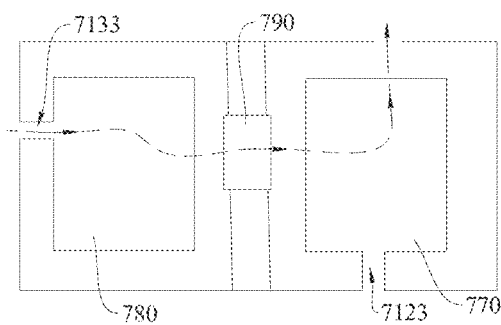
FIG. 16 is a first brief view of a filtering mechanism of a cleaning device according to the present disclosure.
Figure 17:
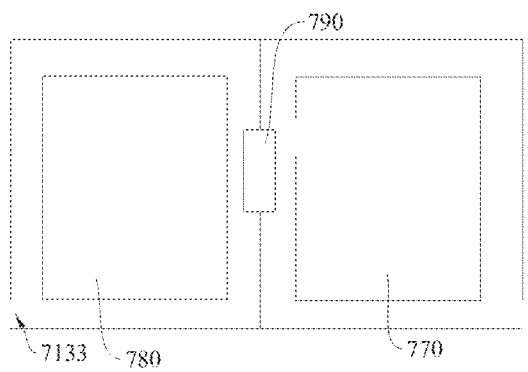
FIG. 17 is a second brief view of a filtering mechanism of a cleaning device according to the present disclosure.
Figure 18:
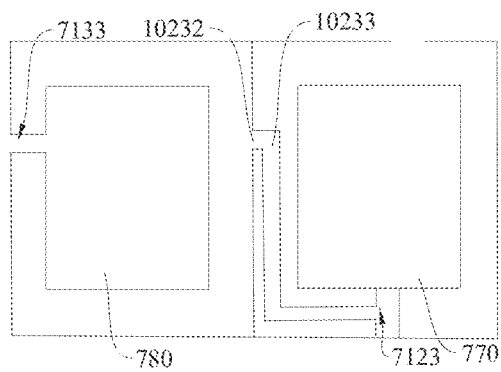
FIG. 18 is a third brief view of a filtering mechanism of a cleaning device according to the present disclosure.

FIG. 16 is a first brief view of the filtering mechanism of the cleaning device according to a seventh embodiment of the present disclosure. FIG. 17 is a second brief view of the filtering mechanism of the cleaning device according to an eighth embodiment of the present disclosure. FIG. 18 is a third brief view of the filtering mechanism of the cleaning device according to an embodiment of the present disclosure. In some embodiments, the cleaning device body 101 includes the liquid inlet portion 103. The liquid inlet portion 103 is configured to allow the liquid to enter the cleaning device body 101. The liquid inlet portion 103 includes the first water inlet 1031 and the second water inlet 1032. The filtering mechanism includes the first filtering assembly 770 and the second filtering assembly 780. The second filtering assembly 780 is sleeved inside the first filtering assembly 770. The first water inlet 1031 communicates with the first inlet 7123 of the first filtering assembly 770. The first water inlet 1031 is configured to allow the liquid to enter the first filtering assembly 770 through the first inlet 7123. The second water inlet 1032 communicates with the second inlet 7133 of the second filtering assembly 780. The second water inlet 1032 is configured to allow the liquid to enter the second filtering assembly 780 through the second inlet 7133. When the cleaning device 10 performs underwater cleaning, the liquid sequentially flows through the first water inlet 1031, the first inlet 7123, the first filtering assembly 770, and the main water pump 210, so that the cleaning device 10 implements underwater cleaning. When the cleaning device 10 performs water surface cleaning, the liquid sequentially flows through the second water inlet 1032, the second inlet 7133, the second filtering assembly 780, the first filtering assembly 770, and the main water pump 210, so that the cleaning device 10 implements water surface cleaning. When the cleaning device 10 performs water surface cleaning, the liquid flows through double layers of filtering boxes 711, so that the cleaning efficiency of the cleaning device 10 in water surface cleaning is improved.

By connecting the two filtering assemblies 710 in series, the first water inlet 1031 communicates with the first inlet 7123 of the first filtering assembly 770, and the second water inlet 1032 communicates with the second inlet 7133 of the second filtering assembly 780, so that the cleaning device 10 can perform underwater cleaning and water surface cleaning. This expands usage scenarios of the cleaning device 10 and improves user experience. Structures of the first filtering assembly 770 and the second filtering assembly 780 may be substantially the same or different. This is not limited herein. The first filtering assembly 770 includes a first sub-filtering box 712. The first water inlet 1031 communicates with a first inlet 7123 of the first sub-filtering box 712. The second filtering assembly 780 includes a second sub-filtering box 713. The second water inlet 1032 communicates with a second inlet 7133 of the second sub-filtering box 713.

When the cleaning device 10 performs underwater cleaning, the second water inlet 1032 or the second inlet 7133 may be closed to prevent the second water inlet 1032, the second filtering assembly 780, and the main water pump 210 from diverting liquid and to ensure a liquid sucking effect at the first water inlet 1031 and the first inlet 7123. In an actual process, when a power of the main water pump 210 is sufficiently high, the second water inlet 1032 or the second inlet 7133 may alternatively not be closed. Similarly, when the cleaning device 10 performs water surface cleaning, the first water inlet 1031 or the first inlet 7123 may be closed to prevent the first water inlet 1031, the first filtering assembly 770, and the main water pump 210 from diverting liquid and to ensure a liquid sucking effect at the second water inlet 1032 and the second inlet 7133. In an actual process, when the power of the main water pump 210 is sufficiently high, the first water inlet 1031 or the first inlet 7123 may alternatively not be closed.

In some embodiments, the cleaning device body 101 includes a first filtering box cavity, a second filtering box cavity, and the liquid inlet portion 103. The first filtering box cavity and the second filtering box cavity are disposed side by side. In other words, the first filtering box cavity and the second filtering box cavity are independent of each other. The liquid inlet portion 103 is configured to allow the liquid to enter the cleaning device body 101. The liquid inlet portion 103 includes the first water inlet 1031 and the second water inlet 1032. The filtering mechanism includes the first filtering assembly 770 and the second filtering assembly 780. The first filtering assembly 770 is disposed in the first filtering box cavity. The second filtering assembly 780 is disposed in the second filtering box cavity. The first water inlet 1031 communicates with the first inlet 7123 of the first filtering assembly 770. The first water inlet 1031 is configured to allow the liquid to enter the first filtering assembly 770 through the first inlet 7123. The second water inlet 1032 communicates with the second inlet 7133 of the second filtering assembly 780. The second inlet is configured to allow the liquid to enter the second filtering assembly 780 through the second inlet 7133. The main water pump 210 communicates with the first filtering box cavity and the second filtering box cavity.

When the cleaning device 10 performs underwater cleaning, under the action of the main water pump 210, the liquid sequentially flows through the first water inlet 1031, the first inlet 7123, the first filtering assembly 770, and the main water pump 210. When the cleaning device 10 performs water surface cleaning, under the action of the main water pump 210, the liquid sequentially flows through the second water inlet 1032, the second inlet 7133, the second filtering assembly 780, and the main water pump 210. By connecting the two filtering assemblies 710 in parallel, two water flow paths are independently controlled and do not affect each other. Corresponding closed structures are disposed on the two water flow paths, so that the two water flow paths are independent of each other. The closed structure may be disposed at a position that needs to be closed, such as a junction of the first filtering box cavity and the second filtering box cavity. This is not limited herein. There may be one or two main water pumps 210. When there is one main water pump 210, the first filtering assembly 770 and the second filtering assembly 780 share the main water pump 210. When there are two main water pumps 210, one main water pump 210 communicates with the first filtering assembly 770, and the other main water pump 210 communicates with the second filtering assembly 780.

In some embodiments, the first filtering box cavity and the second filtering box cavity are isolated from each other. The main water pump 210 acts on the first filtering box cavity. The second filtering box cavity is provided with a filtering box cavity opening 10232. The filtering box cavity opening 10232 communicates, through a filtering box cavity duct 10233, with the first inlet 7123 of the first filtering assembly 770 disposed in the first filtering box cavity, so that during water surface cleaning, the liquid sequentially flows through the second filtering assembly 780 and the first filtering assembly 770, to implement a good water surface cleaning effect.

In some embodiments, the cleaning device body 101 includes the first filtering box cavity, the second filtering box cavity, and the liquid inlet portion 103. The first filtering box cavity and the second filtering box cavity are disposed side by side. In other words, the first filtering box cavity and the second filtering box cavity are independent of each other. The liquid inlet portion 103 is configured to allow the liquid to enter the cleaning device body 101. The liquid inlet portion 103 includes the first water inlet 1031 and the second water inlet 1032. The filtering mechanism includes the first filtering assembly 770, the second filtering assembly 780, and a valve part 790. The first filtering assembly 770 is disposed in the first filtering box cavity. The second filtering assembly 780 is disposed in the second filtering box cavity. The valve part 790 may communicate with the first filtering box cavity and the second filtering box cavity in an open-close manner. When the valve part 790 is opened, the first filtering box cavity communicates with the second filtering box cavity. When the valve part 790 is closed, the first filtering box cavity dis-communicates with the second filtering box cavity.

Specifically, when the cleaning device 10 performs underwater cleaning, the valve part 790 is closed. The liquid sequentially flows through the first water inlet 1031, the first inlet 7123 of the first filtering assembly 770, the first filtering assembly 770, the first filtering box cavity, and the main water pump 210, and is discharged from the cleaning device

10, so that the cleaning device 10 implements underwater cleaning. When the cleaning device 10 performs water surface cleaning, the valve part 790 is opened. The liquid sequentially flows through the second water inlet 1032, the second inlet 7133 of the second filtering assembly 780, the second filtering assembly 780, a space between the second filtering assembly 780 and the second filtering box cavity, the valve part 790, the first filtering assembly 770, and the main water pump 210, and is discharged from the cleaning device 10, so that the cleaning device 10 implements water surface cleaning. In this way, the two water flow paths are independently controlled and do not affect each other. In addition, when the cleaning device 10 performs water surface cleaning, the second filtering assembly 780 and the first filtering assembly 770 are disposed to increase the water flow path, thereby improving the cleaning efficiency of the cleaning device 10 in water surface cleaning. A specific structure of the valve part 790 is not limited herein, provided that the valve part 790 can be opened and closed. Certainly, in other embodiments, the filtering mechanism may not include the valve part 790, and the first filtering assembly 770 and the second filtering assembly 780 directly communicate with each other through a duct or the like. A structure, for example, a cover plate, may be disposed at the second inlet of the second filtering assembly 780, and the cover plate may close the second inlet in an open-close manner.

The first filtering assembly 770 and second filtering assembly 780 may extend along a moving direction of the cleaning device 10. In other words, the first filtering assembly 770 and the second filtering assembly 780 are disposed one behind the other. Alternatively, the first filtering assembly 770 and the second filtering assembly 780 are disposed along a direction perpendicular to the moving direction of the cleaning device 10. In other words, the first filtering assembly 770 and the second filtering assembly are arranged left and right. Alternatively, the first filtering assembly 770 and the second filtering assembly 780 are disposed vertically. Certainly, the first filtering assembly 770 and the second filtering assembly 780 may be disposed side by side in another manner. This is not limited herein.

Figure 19:
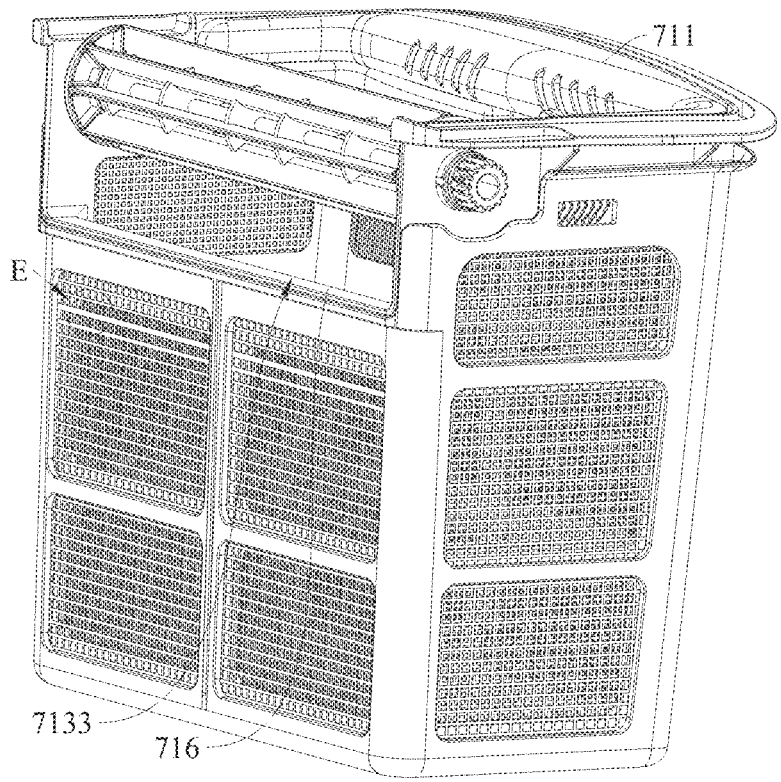
FIG. 19 is a schematic structural view of a filtering assembly of a cleaning device according to a third embodiment of the present disclosure.
Figure 20:
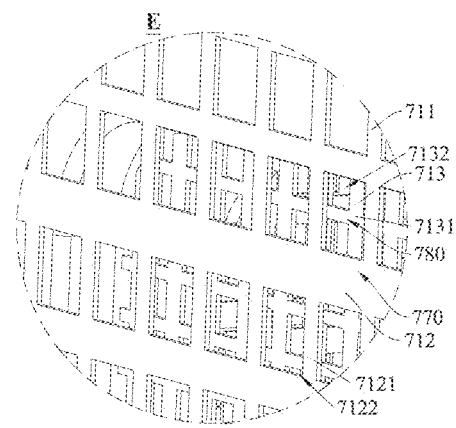
FIG. 20 is an enlarged view of a portion E shown in FIG. 19.
Figure 21:
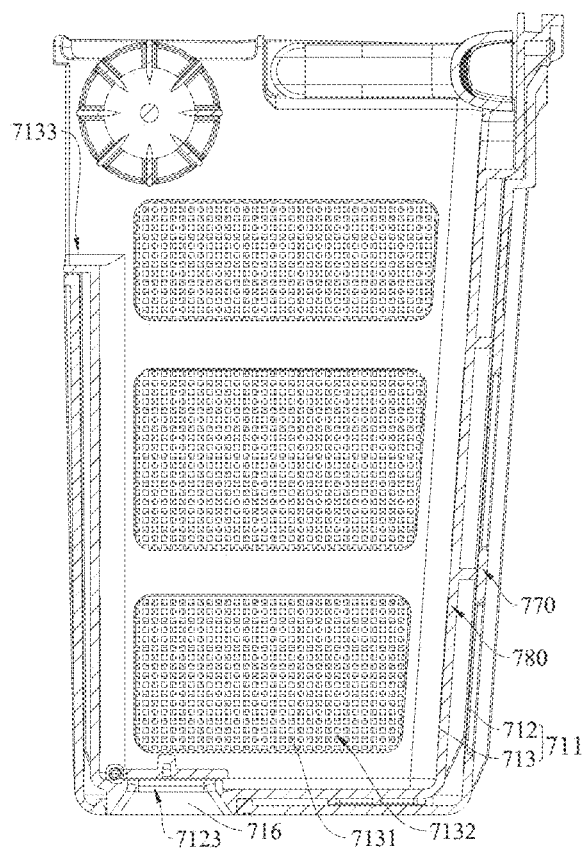
FIG. 21 is a schematic cross-sectional view of a filtering assembly of a cleaning device according to a third embodiment of the present disclosure.

FIG. 19 is a schematic structural view of the filtering assembly of the cleaning device according to a third embodiment of the present disclosure. FIG. 20 is an enlarged view of a portion E shown in FIG. 19. FIG. 21 is a schematic cross-sectional view of the filtering assembly of the cleaning device according to the third embodiment of the present disclosure. The filtering box 711 in the filtering mechanism plays a crucial role in performing filtering. Therefore, a higher mesh count of the first filtering layer disposed on the side wall of the filtering box 711 indicates a better filtering effect of the filtering box 711. However, when the mesh count of the first filtering layer increases, the filtering box 711 is clogged more easily, and it is difficult to clean the first filtering layer. Therefore, the present disclosure provides double layers or multiple layers of filtering boxes 711. For example, corresponding filtering meshes of the double layers of filtering boxes 711 are disposed in a staggered manner. This can improve a filtering effect of the filtering mechanism and reduce a corresponding mesh count, thereby conveniently cleaning the filtering layer.

Figure 22:
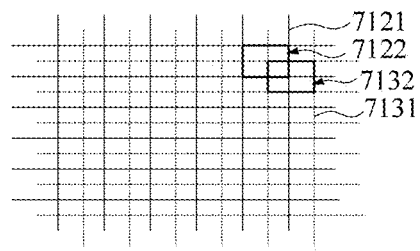
FIG. 22 is a schematic structural view of a first filtering layer and a second filtering layer of a cleaning device according to a fourth embodiment of the present disclosure.
Figure 23:
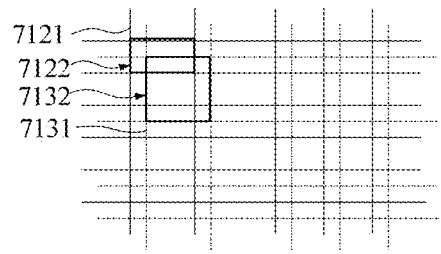
FIG. 23 is a schematic structural view of a first filtering layer and a second filtering layer of a cleaning device according to a fifth embodiment of the present disclosure.
Figure 24:
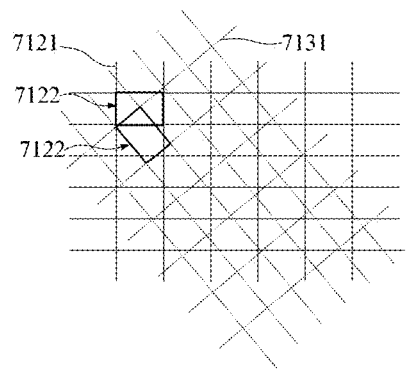
FIG. 24 is a schematic structural view of a first filtering layer and a second filtering layer of a cleaning device according to a sixth embodiment of the present disclosure.

FIG. 22 is a schematic structural view of the first sub-filtering layer and the second sub-filtering layer of the cleaning device according to a fourth embodiment of the present disclosure. FIG. 23 is a schematic structural view of the first sub-filtering layer and the second sub-filtering layer of the cleaning device according to a fifth embodiment of the present disclosure. FIG. 24 is a schematic structural view of the first sub-filtering layer and the second sub-filtering layer of the cleaning device according to a sixth embodiment of the present disclosure. With reference to FIG. 19, FIG. 20, and FIG. 21, in some embodiments, the filtering box 711 includes a first sub-filtering box 712 and a second sub-filtering box 713. A first sub-filtering layer 7121 is disposed on a side wall of the first sub-filtering box 712. The first sub-filtering layer 7121 performs a filtering function. The first sub-filtering layer 7121 includes a certain quantity of first filtering mesh holes 7122. A second sub-filtering layer 7131 is disposed on a side wall of the second sub-filtering box 713. The second sub-filtering layer 7131 includes a certain quantity of second filtering mesh holes 7132. A material of the first sub-filtering layer 7121 may be the same as or different from that of the second sub-filtering layer 7131. This is not limited herein. The second sub-filtering box 713 is sleeved inside the first sub-filtering box 712. The first filtering mesh holes 7122 of the first sub-filtering layer 7121 and the second filtering mesh holes 7132 of the second sub-filtering layer 7131 are at least partially disposed in a staggered manner.

In the present disclosure, the first sub-filtering box 712 is stacked on the second sub-filtering box 713, and the first filtering mesh holes 7122 and the second filtering mesh holes 7132 are at least partially disposed in a staggered manner. When a gap between the first sub-filtering box 712 and the second sub-filtering box 713 is small, the two staggered sub-filtering layers each with a low mesh count form a filtering effect equivalent to that implemented by a filtering layer of a high mesh count. Compared to the conventional technology in which only one filtering box 711 is configured to perform filtering, the present disclosure implements the same filtering effect through two filtering layers as that implemented by a filtering layer of a high mesh count. The filtering box 711 is disassembled into the first sub-filtering box 712 and the second sub-filtering box 713, so that it is easier to clean the first sub-filtering box 712 and the second sub-filtering box 713 each with a low mesh count.

In some embodiments, the first filtering mesh holes 7122 and the second filtering mesh holes 7132 are movably or rotationally staggered, so that the first filtering mesh holes 7122 and the second filtering mesh holes 7132 are at least partially disposed in a staggered manner. That the first filtering mesh holes 7122 and the second filtering mesh holes 7132 are movably staggered means that the first filtering mesh holes 7122 and the second filtering mesh holes 7132 may be staggered along a straight-line direction, for example, a horizontal direction or a vertical direction. A quantity of first filtering mesh holes 7122 may be equal to or different from that of the second filtering mesh holes 7132.

In some embodiments, the first filtering mesh holes 7122 and the second filtering mesh holes 7132 are rotationally staggered, so that the first filtering mesh holes 7122 and the second filtering mesh holes 7132 are at least partially disposed in a staggered manner. That the first filtering mesh holes 7122 and the second filtering mesh holes 7132 are rotationally staggered means that the first sub-filtering layer 7121 rotates, the second sub-filtering layer 7131 rotates, or both the first sub-filtering layer 7121 and the second sub-filtering layer 7131 rotate, so that the first filtering mesh holes 7122 and the second filtering mesh holes 7132 are at least partially disposed in a staggered manner. A quantity of first filtering mesh holes 7122 may be equal to or different from that of second filtering mesh holes 7132.

In some embodiments, a size of the first filtering mesh hole 7122 may be different from that of the second filtering mesh hole 7132. For example, the size of the first filtering mesh hole 7122 is larger or smaller than that of the second filtering mesh hole 7132, so that the first filtering mesh holes 7122 and the second filtering mesh holes 7132 are at least partially disposed in a staggered manner. A quantity of the first filtering mesh holes 7122 is different from that of the second filtering mesh holes 7132. Certainly, the first filtering mesh holes 7122 and the second filtering mesh holes 7132 may be disposed in a staggered manner in another manner. This is not limited herein.

In a process of sleeving the second sub-filtering box 713 on the first sub-filtering box 712, the first sub-filtering layer 7121 in the first sub-filtering box 712 and the second sub-filtering layer 7131 in the second sub-filtering box 713 may be attached to each other, or a small gap is formed between the first sub-filtering layer 7121 and the second sub-filtering layer 7131. The gap is less than or equal to a size of a filtering mesh hole. The filtering mesh hole may be the first filtering mesh hole 7122 or the second filtering mesh hole 7132. The size of the filtering mesh hole may be a diameter, a length, or a width of the filtering mesh hole. This is not limited herein.

In some embodiments, when the filtering mechanism includes the filtering assembly 710, the filtering assembly 710 may include one layer of, two layers of, or multiple layers of filtering boxes 711. When the filtering mechanism includes the first filtering assembly 770 and the second filtering assembly 780, the first filtering assembly 770 may include one layer of, two layers of, or multiple layers of filtering boxes 711, and the second filtering assembly 780 may include one layer of, two layers of, or multiple layers of filtering boxes 711. When the filtering mechanism includes both the first filtering assembly 770 and the second filtering assembly 780, and the first filtering assembly 770 and the second filtering assembly 780 are disposed side by side, a size of a filtering mesh hole of the first filtering assembly 770 is smaller than a size of a filtering mesh hole of the second filtering assembly 780. In this way, the first filtering assembly 770 is more suitable to clean underwater garbage, and the second filtering assembly 780 is more suitable to clean water surface garbage. The filtering mesh holes of the two layers or multiple layers of filtering boxes 711 are at least partially disposed in a staggered manner to improve the cleaning efficiency of the filtering mechanism. Because a size of garbage on the liquid surface 30 is larger than a size of garbage under the liquid surface 30, a size of the filtering mesh hole of the first filtering layer of the filtering assembly when the cleaning device 10 performs water surface cleaning is larger than a size of the filtering mesh hole of the first filtering layer of the filtering assembly when the cleaning device 10 performs underwater cleaning. In some embodiments, the filtering box 711 may be provided with two or more first filtering layers. The cover part 720 covers the flow guiding opening 715 on the filtering assembly 710 or is opened to expose the flow guiding opening 715 on the filtering assembly 710. When the cleaning device 10 performs underwater cleaning, the cover part 720 covers the flow guiding opening 715. The plurality of filtering layers are stacked to perform filtering, so that filtering efficiency for underwater cleaning is increased. When the cleaning device 10 performs water surface cleaning, the cover part 720 is at least partially opened to expose the flow guiding opening 715, and a quantity of first filtering layers is reduced by using the flow guiding opening 715. In this way, large garbage on the liquid surface 30 can be filtered easily, and the large garbage is less likely to block the plurality of first filtering layers. A structure, a disposition manner, and a position of the cover part 720 are the same as those described above. Details are not described herein again.

In some embodiments, as shown in FIG. 1, the cleaning device 10 includes a cleaning device body 101 and a filtering box 711. The filtering box 711 is detachably disposed on the cleaning device body 101. When the cleaning device 10 operates, the filtering box 711 can collect and filter out garbage in the pool, and the filtering box 711 is manually cleaned by a user to ensure a cleaning effect. In the conventional technology, the cleaning device 10 still operates even when the filtering box 711 is not mounted or is not mounted in position, resulting in ineffective operation or a poor cleaning effect. For example, when the user forgets to mount the filtering box 711, the cleaning device 10 is still placed in the water and performs cleaning. However, the cleaning device 10 in this state cannot filter dirty water. After the cleaning device 10 sucks the dirty water, the dirty water is directly discharged from a water pump outlet immediately, resulting in ineffective operation of the cleaning device 10. In addition, if the cleaning device 10 operates without the filtering box 711, large and rigid debris may be sucked into a water pump impeller. Consequently, the water pump impeller is broken or entangled, leading to a machine failure.

Figure 25:
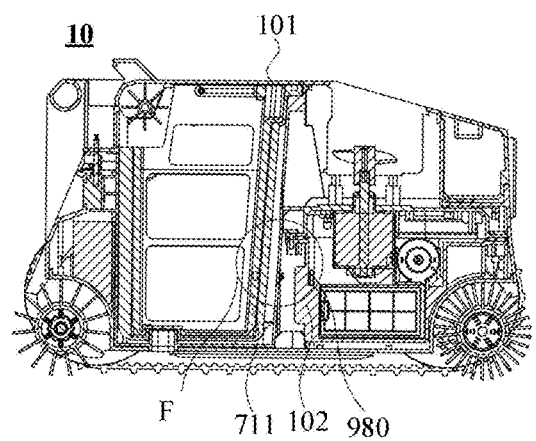
FIG. 25 is a schematic cross-sectional view of a filtering assembly of a cleaning device according to a tenth embodiment of the present disclosure.
Figure 26:
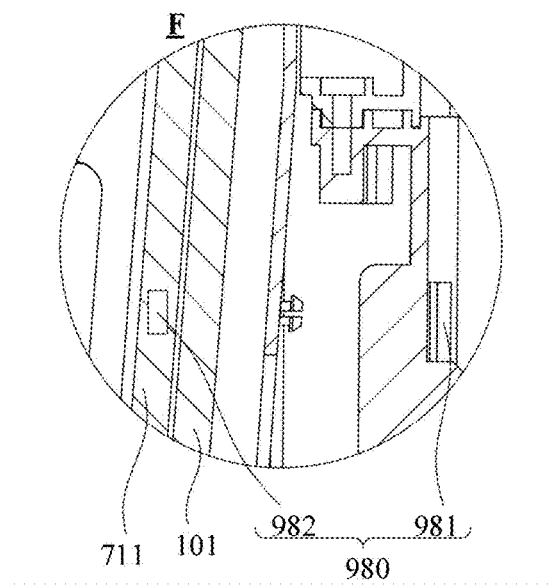
FIG. 26 is an enlarged view of a portion F shown in FIG. 25.

FIG. 25 is a schematic cross-sectional view of the filtering assembly of the cleaning device according to a tenth embodiment of the present disclosure. FIG. 26 is an enlarged view of a portion F shown in FIG. 25. To solve the above problem, this embodiment provides a cleaning device 10. The cleaning device 10 includes an in-position detection mechanism for a filtering box. The in-position detection mechanism for the filtering box is configured to detect whether the filtering box 711 is mounted in position on the cleaning device body 101 to ensure that, only after the filtering box 711 is mounted in position, the cleaning device 10 can operate normally. This eliminates any user misoperation, prevents ineffective cleaning or a poor cleaning effect, and better improves intelligence of the cleaning device 10. The in-position detection mechanism for the filtering box includes at least one of: a sensing assembly 980, an inductance assembly, or a switch assembly. For example, the in-position detection mechanism for the filtering box may be the sensing assembly 980 or the inductance assembly or the switch assembly. The in-position detection mechanism for the filtering box may include all of the sensing assembly 980, the inductance assembly, and the switch assembly. The sensing assembly 980 may detect, in a sensing manner, whether the filtering box 711 is mounted in position, and the sensing manner may be implemented through cooperation between a Hall element and a Hall magnet. The inductance assembly may detect, in an inductive manner, whether the filtering box 711 is disposed in position. The switch assembly detects, by using a switching part, whether the filtering box 711 is disposed in position.

It should be noted that because the cleaning device 10 generally operates underwater or in water, waterproof performance of the sensing assembly 980, waterproof performance of the inductance assembly, and waterproof performance of the switch assembly are crucial. Therefore, in this embodiment, the sensing assembly 980, the inductance assembly, and the switch assembly may be provided with a waterproof structure as required, to prevent short circuits. This ensures use performance of the in-position detection mechanism for the filtering box and improves stability of the in-position detection mechanism for the filtering box.

While ensuring the cleaning effect of the cleaning device 10, the in-position detection mechanism for the filtering box can further prevent rigid debris from being sucked into the main water pump impeller 212, so that the main water pump impeller 212 is prevented from being damaged or entangled, and the cleaning device 10 is prevented from malfunctioning. This helps improve operation safety and a service life of the cleaning device 10. The in-position detection mechanism for the filtering box includes at least one of the sensing assembly 980, the inductance assembly, or the switch assembly, so that a quantity of detection manners can be increased. A detection manner can be selected based on an actual situation. In an actual process, the in-position detection mechanism for the filtering box may further have other detection manners. This is not limited herein.

In some embodiments, the in-position detection mechanism for the filtering box includes the sensing assembly 980. The sensing assembly 980 includes a sensing part 981 and a sensing mating part 982. When the filtering box 711 is mounted in position, the sensing part 981 and the sensing mating part 982 mate with each other to detect whether the filtering box 711 is mounted in position on the cleaning device body 101 to ensure that, only after the filtering box 711 is mounted in position, the cleaning device 10 can operate normally. This eliminates any user misoperation, prevents ineffective cleaning or a poor cleaning effect, and better improves intelligence of the cleaning device 10.

One of the sensing part 981 and sensing mating part 982 is disposed directly on the filtering box 711, and the other one of the sensing part 981 and the sensing mating part 982 is disposed on the cleaning device body 101. Specific positions at which the sensing part 981 and sensing mating part 982 are disposed can be determined based on an actual situation. Alternatively, the sensing part 981 and the sensing mating part 982 both are not disposed on the filtering box 711 but are disposed at other positions. The filtering box 711 moves to drive the sensing part 981 and the sensing mating part 982 to mate with each other to detect whether the filtering box 711 is mounted in position. The following describes the above two manners in detail.

In some embodiments, the sensing part 981 is disposed on one of the cleaning device body 101 and the filtering box 711, and the sensing mating part 982 is disposed on the other one of the cleaning device body 101 and the filtering box 711. For example, the sensing part 981 is disposed on the cleaning device body 101, and the sensing mating part 982 is disposed on the filtering box 711. Alternatively, the sensing part 981 is disposed on the filtering box 711, and the sensing mating part 982 is disposed on the cleaning device body 101. In other words, relative positions of the sensing part 981 and the sensing mating part 982 may be changed as required.

When the sensing part 981 is disposed on the cleaning device body 101, and the sensing mating part 982 is disposed on the filtering box 711, the sensing mating part 982 is detachably or fixedly connected to the filtering box 711. For example, the filtering box 711 is provided with a mounting groove. The sensing mating part 982 is sealed in the mounting groove, so that a magnetic field of the sensing mating part 982 is prevented from being affected by water, and a magnet is prevented from falling off. This helps ensure stable operation of the in-position detection mechanism for the filtering box. Alternatively, the sensing mating part 982 and the filtering box 711 are an integral structure, so that the sensing mating part 982 is disposed inside the side wall of the filtering box 711. This helps simplify an assembly process and improve assembly efficiency.

It may be understood that, because the filtering box 711 is detachable, it may be difficult to dispose a circuit for detection when the sensing part 981 is disposed on the filtering box 711. Therefore, the sensing part 981 in this embodiment is a Hall sensing part, and the sensing mating part 982 is a magnet. When the filtering box 711 is mounted in position, the magnet and the Hall sensing part may sense each other without contact under the action of a magnetic field of the magnet. In this way, the magnet can be disposed on the detachable filtering box 711 without considering a short circuit caused by being in contact with water or a connection problem, leading to a simple structure and high safety. Specifically, in the sensing assembly 980, the magnet is used to affect an internal magnetic field to conduct a circuit, so that whether the circuit is open or closed can be detected. When the filtering box 711 is mounted in position on the cleaning device body 101, the magnet gradually approaches the Hall sensing part, and strength of the magnetic field at the Hall sensing part is increased, so that the Hall sensing part is in a triggered state. When the filtering box 711 is removed, the magnet gradually moves away from the Hall sensing part, and the strength of the magnetic field at the Hall sensing part is decreased, so that the Hall sensing part cannot be triggered. When the Hall sensing part and the magnet are two independent components, the Hall sensing part and the magnet can be waterproofed independently. A magnetic field can penetrate the filtering box 711 and the cleaning device body 101, so that the Hall sensing part and the magnet can sense each other.

Figure 27:
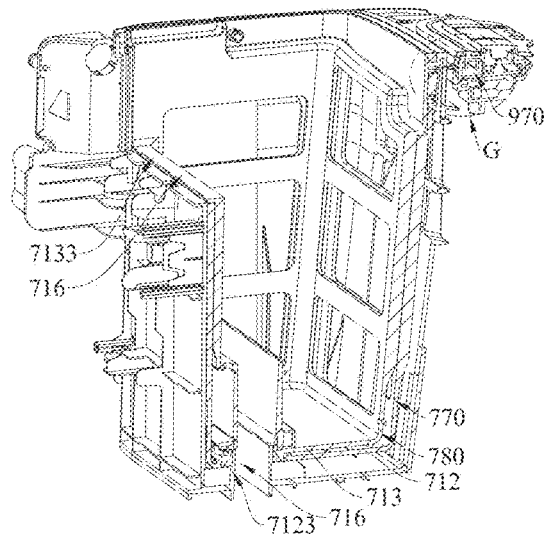
FIG. 27 is a schematic cross-sectional view of a filtering assembly of a cleaning device according to an eleventh embodiment of the present disclosure.
Figure 28:
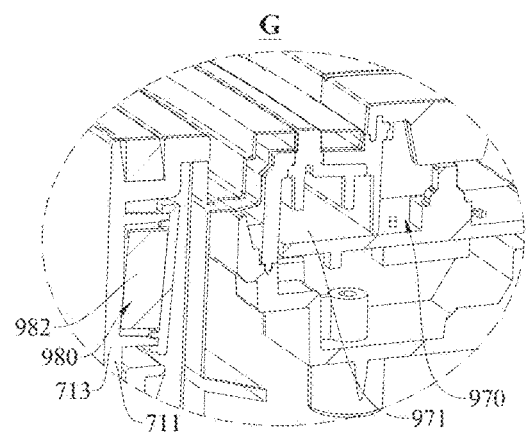
FIG. 28 is an enlarged view of a portion G shown in FIG. 27.
Figure 29:
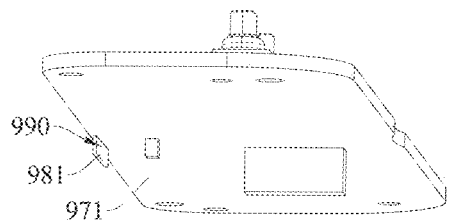
FIG. 29 is a partial schematic view of a cleaning device according to an eleventh embodiment of the present disclosure.

FIG. 27 is a schematic cross-sectional view of the filtering assembly of the cleaning device according to an eleventh embodiment of the present disclosure. FIG. 28 is an enlarged view of a portion G shown in FIG. 27. FIG. 29 is a partial schematic view of the cleaning device according to the eleventh embodiment of the present disclosure. The Hall sensing part may not be waterproofed. The Hall sensing part is disposed in a sealed space. The sealed space may be a light assembly 970. In other words, the cleaning device 10 includes the light assembly 970. The light assembly 970 is sealed inside the cleaning device body 101. The Hall sensing part is disposed inside the light assembly 970 and is connected to a controller described later via signals. Further, the Hall sensing part is disposed directly on a light control board 971 of the light assembly 970 to fully use a space of the light control board 971. The Hall sensing part is connected to the controller via signals, or the light control board 971 is connected to the controller via signals.

The sealed space may alternatively be a first sealed cavity 1021. The cleaning device 10 includes the first sealed cavity 1021. The first sealed cavity 1021 is configured to mount the main water pump motor 211. The Hall sensing part is disposed in the first sealed space and is then connected to the controller via signals.

Figure 30:
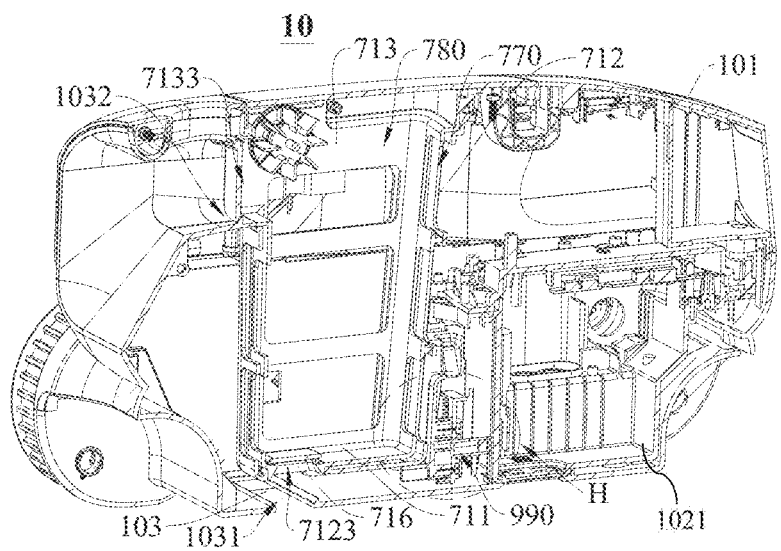
FIG. 30 is a schematic cross-sectional view of a cleaning device according to a twelfth embodiment of the present disclosure.
Figure 31:
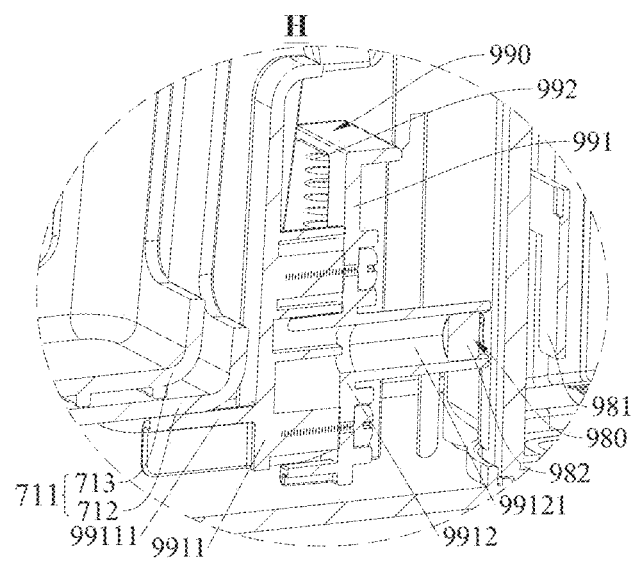
FIG. 31 is an enlarged view of a portion H shown in FIG. 30.

FIG. 30 is a schematic cross-sectional view of the cleaning device according to a twelfth embodiment of the present disclosure. FIG. 31 is an enlarged view of a portion H shown in FIG. 30. In some embodiments, the sensing part 981 and the sensing mating part 982 both are not disposed on the filtering box 711 but are disposed at other positions. Specifically, the cleaning device 10 includes the filtering box cavity 1023 and the first sealed cavity 1021. The filtering box 711 is detachably disposed in the filtering box cavity 1023. The in-position detection mechanism for the filtering box is configured to detect whether the filtering box 711 is mounted in position in the filtering box cavity 1023. The first sealed cavity 1021 is sealed. The in-position detection mechanism for the filtering box includes a sensing drive assembly 990. The sensing drive assembly 990 is connected to the filtering box cavity 1023. The sensing part 981 is disposed on one of the sensing drive assembly 990 and the first sealed cavity 1021. The sensing mating part 982 is disposed on the other one of the sensing drive assembly 990 and the first sealed cavity 1021. The filtering box 711 acts on the sensing drive assembly 990, so that the sensing part 981 and the sensing mating part 982 mate with each other. In a process of placing the filtering box 711 in the filtering box cavity 1023, the filtering box 711 presses down on the sensing drive assembly 990, and the sensing drive assembly 990 moves, so that the sensing part 981 can sense the sensing mating part 982 to detect whether the filtering box 711 is disposed in position in the filtering box cavity 1023. In other words, if a distance between the sensing part 981 and the sensing mating part 982 is less than or equal to a detection distance, it indicates that the filtering box 711 is mounted in position in the filtering box cavity 1023. The detection distance is a maximum distance at which the sensing part 981 is capable of sensing the sensing mating part 982 or the sensing mating part 982 is capable of sensing the sensing part 981. In a process of removing the filtering box 711 from the filtering box cavity 1023, the sensing drive assembly 990 rises, so that the sensing part 981 cannot sense the sensing mating part 982. In other words, if the distance between the sensing part 981 and the sensing mating part 982 is greater than the detection distance, it indicates that the filtering box 711 is not mounted in position in the filtering box cavity 1023. The sensing drive assembly 990 is disposed between the filtering box cavity 1023 and the first sealed cavity 1021 and is configured to detect whether the filtering box 711 is mounted in position in the filtering box cavity 1023. The sensing part 981 is disposed in the first sealed cavity 1021, and the sensing mating part 982 is disposed on the filtering box 711, or the sensing part 981 is disposed on the filtering box 711, and the sensing mating part 982 is disposed in the first sealed cavity 1021. Positions of the sensing part 981 and the sensing mating part 982 may be determined as required.

The sensing drive assembly 990 may be connected to the filtering box cavity 1023 in a plurality of manners. For example, in some specific embodiments, the sensing drive assembly 990 is telescopically connected to the filtering box cavity 1023. In the process of placing the filtering box 711 in the filtering box cavity 1023, the filtering box 711 presses down on the sensing drive assembly 990. The sensing drive assembly 990 is pressed and lowered, so that the sensing part 981 can sense the sensing mating part 982 to detect whether the filtering box 711 is mounted in position in the filtering box cavity 1023. In the process of removing the filtering box 711 from the filtering box cavity 1023, the sensing drive assembly 990 is reset, so that the sensing part 981 cannot sense the sense mating part 982.

In some other embodiments, the sensing drive assembly 990 is rotatably connected to the filtering box cavity 1023. In the process of placing the filtering box 711 in the filtering box cavity 1023, the filtering box 711 acts on one end of the sensing drive assembly 990, enabling the end of the sensing drive assembly 990 to be lowered, and then the sensing drive assembly 990 rotates relative to the filtering box cavity 1023, enabling another end of the sensing drive assembly 990 to rise, so that the sensing part 981 can sense the sensing mating part 982 to detect whether the filtering box 711 is mounted in position in the filtering box cavity 1023. In the process of removing the filtering box 711 from the filtering box cavity 1023, the end of the sensing drive assembly 990 rises and is reset, and the another end of the sensing drive assembly 990 is lowered and reset, so that the sensing part 981 cannot sense the sensing mating part 982.

Figure 32:
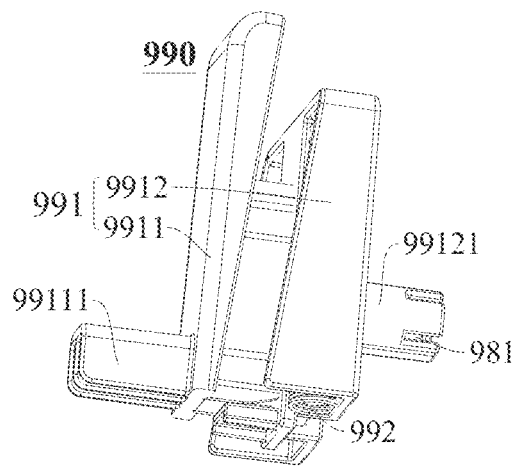
FIG. 32 is a schematic view of a sensing drive assembly of a cleaning device in a first state according to a twelfth embodiment of the present disclosure.
Figure 33:
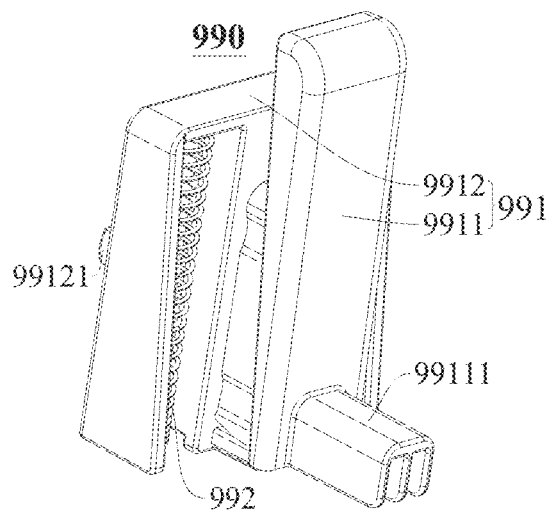
FIG. 33 is a schematic view of a sensing drive assembly of a cleaning device in a second state according to a twelfth embodiment of the present disclosure.

FIG. 32 is a schematic view of the sensing drive assembly of the cleaning device in a first state according to the twelfth embodiment of the present disclosure. FIG. 33 is a schematic view of the sensing drive assembly of the cleaning device in a second state according to the twelfth embodiment of the present disclosure. In some specific embodiments, when the sensing drive assembly 990 is telescopically connected to the filtering box cavity 1023, the sensing drive assembly 990 may include a sensing bracket 991 and a sensing elastic part 992. A first bracket portion 99111 and a second bracket portion 99121 are respectively disposed at two ends of the sensing bracket 991. The first bracket portion 99111 is disposed inside the filtering box cavity 1023. The second bracket portion 99121 is provided with the sensing mating part 982 and is located outside the filtering box cavity 1023. The sensing elastic part 992 has certain elasticity. The sensing elastic part 992 is connected between the sensing bracket 991 and the filtering box cavity 1023. The filtering box 711 presses down on the first bracket portion 99111, so that the second bracket portion 99121 moves downward to cooperate with the sensing part 981.

Specifically, in the process of placing the filtering box 711 in the filtering box cavity 1023, the filtering box cavity 1023 presses down on the first bracket portion 99111, the second bracket portion 99121 is pressed down as the first bracket portion 99111 moves, and the sensing elastic part 992 is compressed. In this case, the sensing mating part 982 moves to be close to sense the sensing part 981, and relative positions of the sensing mating part 982 and the sensing part 981 are within a sensing range. The sensing assembly 980 is triggered and transmits a signal to the cleaning device body 101, and the cleaning device body 101 recognizes that the filtering box 711 has been mounted in position in the filtering box cavity 1023, and then the cleaning device 10 performs cleaning.

In the process of removing the filtering box 711 from the filtering box cavity 1023, the sensing elastic part 992 is reset, so that the sensing bracket 991 rises. In this case, the sensing mating part 982 moves away from the sensing part 981, and relative positions of the sensing mating part 982 and the sensing part 981 are beyond the sensing range. The sensing assembly 980 transmits a signal to the cleaning device body 101, and the cleaning device body 101 recognizes that the filtering box 711 is not mounted in position in the filtering box cavity 1023, and therefore, the cleaning device 10 does not perform cleaning. At the same time, the cleaning device 10 gives an alarm to prompt that the cleaning device cannot perform cleaning.

Further, the sensing bracket 991 includes a first sensing bracket 9911 and a second sensing bracket 9912. The first sensing bracket 9911 and the second sensing bracket 9912 are detachably connected. The first sensing bracket 9911 is disposed inside the filtering box cavity 1023. The second sensing bracket 9912 is disposed outside the filtering box cavity 1023. An end of the first sensing bracket 9911 faces the interior of the filtering box cavity 1023, and the end is provided with the first bracket portion 99111. An end of the second sensing bracket 9912 faces the exterior of the filtering box cavity 1023, and the end is provided with the second bracket portion 99121. The second bracket portion 99121 is provided with the sensing part 981 or the sensing mating part 982. The sensing elastic part 992 is disposed between the bottom of the second sensing bracket 9912 and the outer bottom of the filtering box cavity 1023. The filtering box cavity 1023 is provided with a sensing sliding groove (shown in the figure). The first sensing bracket 9911 or the second sensing bracket 9912 may slide in the sensing sliding groove, so that the sensing drive assembly 990 is located at various positions.

The sensing mating part 982 may be a magnet. The sensing part 981 may be a Hall sensing part. The magnet and the Hall sensing part may be interchangeably disposed on the sensing drive assembly 990 and the first sealed cavity 1021 as required. The sensing elastic part 992 may be a spring. When the Hall sensing part is disposed in the first sealed cavity 1021, the Hall sensing part does not need to be waterproofed. When the Hall sensing part is disposed on the sensing bracket 991, the Hall sensing part does not need to be waterproofed. In other embodiments, the Hall sensing part may be disposed at other positions on the cleaning device body 101. The in-position detection mechanism for the filtering box further includes a first sealed box. The sensing part 981 is disposed in the first sealed box. The first sealed box is located at a side of the filtering box 711. Because the first sealed box is sealed, the sensing part 981 is waterproofed, preventing the sensing part 981 from being failed caused by being in contact with water. While it is ensured that the sensing part 981 is waterproofed, because operation of the Hall sensing part is limited by a sensing distance, the first sealed box can be disposed close to the filtering box 711 in this manner, so that the Hall sensing part is prevented from being unable to sense the magnet. This ensures stable operation of the sensing assembly 980. In addition, in some embodiments, the cleaning device body 101 further includes a controller. The controller is disposed on the cleaning device body 101. The controller is communicatively connected to the in-position detection mechanism for the filtering box. In a case where the filtering box 711 is mounted in position on the cleaning device body 101, the in-position detection mechanism for the filtering box sends a detection result to the controller to prevent the cleaning device 10 from operating when the filtering box 711 is not mounted in position. For example, the sensing assembly 980, the inductance assembly, and the switch assembly are communicatively connected to the controller. The controller may be disposed at various positions, and the controller needs to be waterproofed. For example, the controller may be disposed inside a second sealed box. Because the second sealed box is sealed, the controller can be waterproofed to prevent a short circuit caused by being in contact with water. This improves the service life of the cleaning device 10. It may be understood that because the second sealed box in which the controller is disposed is sealed, the second sealed box has a waterproof effect. In this embodiment, an inner side of a side wall of the second sealed box is close to the filtering box 711, and the inner side is provided with the sensing part 981, so that the sensing part 981 is protected because the second sealed box is sealed and waterproofed, leading to a simple structure and low costs.

For example, the controller may alternatively be disposed in the first sealed cavity 1021. The controller and the sensing part 981 are both disposed in the first sealed cavity 1021. No additional structure needs to be added, leading to a simple structure and low costs.

In some embodiments, the in-position detection mechanism for the filtering box further includes an alarm part. The alarm part may give an alarm when the filtering box 711 is not mounted in position, reminding the user to check a position of the filtering box 711 in time to avoid a fault.

In some embodiments, a distance between the Hall sensing part and the magnet directly affects sensing between the Hall sensing part and the magnet. Therefore, to ensure stable operation of the sensing assembly 980, the cleaning device 10 further includes a positioning assembly disposed between the cleaning device body 101 and the filtering box 711. The positioning assembly is configured to constrain a position of the filtering box 711 on the cleaning device body 101, to ensure that the filtering box 711 is stably disposed on the cleaning device body 101. In other words, as long as the filtering box 711 is mounted in position, the Hall sensing part can stably sense the magnetic field of the magnet.

For example, a positioning groove is provided on the cleaning device body 101, and a positioning protrusion is provided on the filtering box 711. When the filtering box 711 is mounted in position, the positioning protrusion and the positioning groove mate with each other to form a positioning assembly to constrain displacement of the filtering box 711, so that the filtering box 711 can be quickly positioned relative to the cleaning device body 101. Certainly, the positioning groove may alternatively be provided on the filtering box 711, and the positioning protrusion is provided on the cleaning device body 101. The effect is the same as that described above. Details are not described herein again. Because the distance between the sensing part 981 and the sensing mating part 982 for the sensing part 981 to sense the sensing mating part 982 is limited, sensing between the sensing part 981 and the sensing mating part 982 can be stably triggered only when the filtering box 711 is mounted at a preset position, thereby improving operation stability of the sensing assembly 980.

In other embodiments, the positioning assembly may alternatively be implemented by providing a fastening groove on one of the cleaning device body 101 and the filtering box 711 and providing a fastening hook on the other one of the cleaning device body 101 and the filtering box 711. The fastening groove may be provided at an edge of the filtering box 711 to facilitate assembling and disassembling. The fastening groove and the fastening hook are clamped with each other to constrain the position of the filtering box 711 on the cleaning device body 101 to ensure that the filtering box 711 is stably disposed in the cleaning device body 101. In other words, as long as the filtering box 711 is mounted in position, the Hall sensing part can stably sense the magnetic field of the magnet.

The above description describes only implementations of the present disclosure and is not intended to limit the scope of the present disclosure. Any equivalent structure or equivalent process transformation performed based on the contents of the specification and the accompanying drawings of the present disclosure or applied directly or indirectly in other related technical fields shall fall within the protection scope of the present disclosure.

What is claimed is:

1. A pool cleaning robot, comprising:
   a body (101);
   a filtering box (711) detachably mounted on the body (101); and
   an in-position detection mechanism for the filtering box, wherein the in-position detection mechanism for the filtering box is configured to detect whether the filtering box (711) is mounted in position on the body (101),
   wherein the in-position detection mechanism for the filtering box comprises a sensing assembly (980), and the sensing assembly (980) comprises a sensing part (981) and a sensing mating part (982),
   wherein the sensing part (981) and the sensing mating part (982) are both disposed at a position other than the filtering box (711), and the filtering box (711) moves, so that the sensing part (981) mates with the sensing mating part (982) to detect whether the filtering box (711) is mounted in position on the body (101).

2. The pool cleaning robot according to claim 1, wherein that the sensing part (981) mates with the sensing mating part (982) to detect whether the filtering box (711) is mounted in position on the body (101) indicates that if a distance between the sensing part (981) and the sensing mating part (982) is less than or equal to a detection distance, it indicates that the filtering box (711) is mounted in position on the body (101), or if the distance between the sensing part (981) and the sensing mating part (982) is greater than the detection distance, it indicates that the filtering box (711) is not mounted in position on the body (101), wherein the detection distance is a maximum distance at which the sensing part (981) is capable of sensing the sensing mating part (982) or the sensing mating part (982) is capable of sensing the sensing part (981).

3. The pool cleaning robot according to claim 2, comprising a filtering box cavity (1023) and a first sealed cavity (1021), wherein the filtering box (711) is detachably disposed in the filtering box cavity (1023); and the in-position detection mechanism for the filtering box further comprises a sensing drive assembly (990), wherein the sensing part (981) is disposed on the sensing drive assembly (990), and the sensing mating part (982) is disposed in the first sealed cavity (1021), or the sensing part (981) is disposed in the first sealed cavity (1021), and the sensing mating part (982) is disposed on the sensing drive assembly (990).

4. The pool cleaning robot according to claim 3, wherein the filtering box (711) acts on the sensing drive assembly (990), so that the sensing part (981) mates with the sensing mating part (982) to detect whether the filtering box (711) is mounted in position on the body (101).

5. The pool cleaning robot according to claim 4, wherein in a process of placing the filtering box (711) in the filtering box cavity (1023), the filtering box (711) presses down on the sensing drive assembly (990), and then the sensing drive assembly (990) moves, so that the distance between the sensing part (981) and the sensing mating part (982) is less than or equal to the detection distance.

6. The pool cleaning robot according to claim 4, wherein in a process of removing the filtering box (711) from the filtering box cavity (1023), the sensing drive assembly (990) rises, so that the distance between the sensing part (981) and the sensing mating part (982) is greater than the detection distance.

7. The pool cleaning robot according to claim 4, wherein the sensing drive assembly (990) is disposed between the filtering box cavity (1023) and the first sealed cavity (1021).

8. The pool cleaning robot according to claim 4, wherein the sensing drive assembly (990) is telescopically connected to the filtering box cavity (1023);

in a process of placing the filtering box (711) in the filtering box cavity (1023), the filtering box (711) presses down on the sensing drive assembly (990), and then the sensing drive assembly (990) is pressed down and lowered, so that the distance between the sensing part (981) and the sensing mating part (982) is less than or equal to the detection distance; and in a process of removing the filtering box (711) from the filtering box cavity (1023), the sensing drive assembly (990) rises and is reset, so that the distance between the sensing part (981) and the sensing mating part (982) is greater than the detection distance.

9. The pool cleaning robot according to claim 4, wherein the sensing drive assembly (990) is rotatably disposed;

in a process of placing the filtering box (711) in the filtering box cavity (1023), the filtering box (711) acts on one end of the sensing drive assembly (990), enabling the end of the sensing drive assembly (990) to be lowered, and then the sensing drive assembly (990) rotates, enabling another end of the sensing drive assembly (990) to rise, so that the distance between the sensing part (981) and the sensing mating part (982) is less than or equal to the detection distance; and in a process of removing the filtering box (711) from the filtering box cavity (1023), the end of the sensing drive assembly (990) rises and is reset, and the another end of the sensing drive assembly (990) is lowered and reset, so that the distance between the sensing part (981) and the sensing mating part (982) is greater than the detection distance.

10. The pool cleaning robot according to claim 4, wherein the sensing drive assembly (990) comprises a sensing bracket (991) and a sensing elastic part (992), wherein a first bracket portion (99111) is disposed on one end of the sensing bracket (991), and a second bracket portion (99121) is disposed on another end of the sensing bracket (991), wherein the first bracket portion (99111) is located inside the filtering box cavity (1023), the second bracket portion (99121) is provided with the sensing mating part (982) and located outside the filtering box cavity (1023), and the sensing elastic part (992) is connected between the sensing bracket (991) and the filtering box cavity (1023).

11. The pool cleaning robot according to claim 10, wherein in a process of placing the filtering box (711) in the filtering box cavity (1023), the filtering box (711) presses down on the first bracket portion (99111), the second bracket portion (99121) is pressed down with the first bracket portion (99111), and the sensing elastic part (992) is compressed, so that the distance between the sensing part (981) and the sensing mating part (982) is less than or equal to the detection distance; and in a process of removing the filtering box (711) from the filtering box cavity (1023), the sensing bracket (991) rises under an action of the sensing elastic part (992), enabling the sensing mating part (982) to be away from the sensing part (981), so that the distance between the sensing part (981) and the sensing mating part (982) is greater than the detection distance.

12. The pool cleaning robot according to claim 10, wherein the sensing bracket (991) comprises a first sensing bracket (9911) and a second sensing bracket (9912), wherein the first sensing bracket (9911) is detachably connected to the second sensing bracket (9912), the first sensing bracket (9911) is disposed inside the filtering box cavity (1023), the second sensing bracket (9912) is disposed outside the filtering box cavity (1023), the first bracket portion (99111) is disposed on an end of the first sensing bracket (9911), wherein the end of the first sensing bracket (9911) faces the interior of the filtering box cavity (1023), and the second bracket portion (99121) is disposed on an end of the second sensing bracket (9912), wherein the end of the second sensing bracket (9912) faces the exterior of the filtering box cavity (1023).

13. The pool cleaning robot according to claim 12, wherein a sensing sliding groove is disposed on the filtering box cavity (1023), and the first sensing bracket (9911) or the second sensing bracket (9912) slides in the sensing sliding groove.

14. The pool cleaning robot according to claim 1, wherein the sensing part (981) is a Hall sensing part, and the sensing mating part (982) is a magnet, wherein when the filtering box (711) is mounted in position on the body (101), the magnet and the Hall sensing part sense each other.

15. The pool cleaning robot according to claim 14, wherein the sensing part (981) is waterproofed or is disposed in a sealed space.

16. The pool cleaning robot according to claim 1, further comprising:
- a controller disposed on the body (101) and communicatively connected to the in-position detection mechanism for the filtering box.

17. The pool cleaning robot according to claim 1, wherein the in-position detection mechanism for the filtering box further comprises:
- an alarm part configured to give an alarm when the filtering box (711) is not mounted in position on the body (101).

18. The pool cleaning robot according to claim 1, further comprising:
- a positioning assembly disposed between the body (101) and the filtering box (711) and configured to constrain a position of the filtering box (711) on the body (101).

19. The pool cleaning robot according to claim 18, wherein the positioning assembly comprises a positioning groove and a positioning protrusion, wherein the positioning groove is disposed on the body (101), the positioning protrusion is disposed on the filtering box (711), and when the filtering box (711) is mounted in position on the body (101), the positioning protrusion is located in the positioning groove; or
- the positioning assembly comprises a positioning groove and a positioning protrusion, wherein the positioning protrusion is disposed on the body (101), the positioning groove is disposed on the filtering box (711), and when the filtering box (711) is mounted in position on the body (101), the positioning protrusion is located in the positioning groove.

20. The pool cleaning robot according to claim 18, wherein the positioning assembly comprises a fastening groove and a fastening hook, wherein the fastening groove is disposed on the body (101), the fastening hook is disposed on the filtering box (711), and when the filtering box (711) is mounted in position on the body (101), the fastening groove is clamped with the fastening hook; or
- the positioning assembly comprises a fastening groove and a fastening hook, wherein the fastening hook is disposed on the body (101), the fastening groove is disposed on the filtering box (711), and when the filtering box (711) is mounted in position on the body (101), the fastening groove is clamped with the fastening hook.

* * * * *